US008000193B1

(12) United States Patent
Liu et al.

(10) Patent No.: US 8,000,193 B1
(45) Date of Patent: Aug. 16, 2011

(54) TIMING RECOVERY FOR OPTICAL DISC DRIVE HIGH FREQUENCY MODULATION

(75) Inventors: Jingfeng Liu, Longmont, CO (US); Bin Ni, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 161 days.

(21) Appl. No.: 12/553,820

(22) Filed: Sep. 3, 2009

Related U.S. Application Data

(63) Continuation-in-part of application No. 12/331,050, filed on Dec. 9, 2008.

(60) Provisional application No. 61/094,201, filed on Sep. 4, 2008, provisional application No. 61/015,432, filed on Dec. 20, 2007.

(51) Int. Cl.
*G11B 7/00* (2006.01)

(52) U.S. Cl. .................................. 369/47.28; 369/53.34

(58) Field of Classification Search ........................ None
See application file for complete search history.

(56) References Cited

U.S. PATENT DOCUMENTS

| 4,466,089 A * | 8/1984 | Wachi .......................... 369/59.17 |
| 4,628,497 A * | 12/1986 | Bierhoff ...................... 369/44.32 |
| 4,734,900 A * | 3/1988 | Davie ........................... 369/59.19 |
| 4,740,940 A * | 4/1988 | Tanaka et al. ............... 369/44.25 |
| 4,864,553 A * | 9/1989 | Sakakibara et al. ........ 369/47.46 |
| RE33,665 E * | 8/1991 | Ogawa ........................ 369/30.27 |
| 5,475,664 A * | 12/1995 | Shimizume et al. ........ 369/44.29 |
| 2005/0232105 A1* | 10/2005 | Konagai et al. ............. 369/47.28 |
| 2006/0109756 A1 | 5/2006 | Chen et al. |
| 2006/0250915 A1* | 11/2006 | Park ............................. 369/53.34 |
| 2006/0250918 A1 | 11/2006 | Hsu et al. |
| 2008/0101176 A1* | 5/2008 | Mouri et al. ................. 369/47.5 |

FOREIGN PATENT DOCUMENTS

| WO | WO 2004/017311 | 2/2004 |
| WO | WO 2004/066285 | 8/2004 |
| WO | WO 2004/107342 | 12/2004 |

* cited by examiner

*Primary Examiner* — Peter Vincent Agustin

(57) ABSTRACT

A method and apparatus for recovering clock timing from a hi-phase modulated portion of an HFM signal. The signal includes transitions between high and low levels. A clock count is initiated upon detection of a first transition, which corresponds to an expected clock timing of the signal. The count is stopped upon detection of a second transition. An actual clock count includes a number of clock cycles occurring between the transitions based on the expected timing. A first expected clock count between transitions is identified if the actual clock count between the transitions falls within a first range of clock counts. A first error between the actual and first expected clock counts is determined. A second expected clock count between transitions is identified if the actual clock count between transitions falls within a second range of clock counts. A second error between the actual expected clock counts is determined.

20 Claims, 12 Drawing Sheets

TIMING RECOVERY FOR OPTICAL DISC DRIVE HIGH FREQUENCY MODULATION

RELATED APPLICATION

This is a continuation-in-part application which is based on and claims priority to U.S. Provisional Patent Application Ser. No. 61/094,201, entitled "Blu-Ray HFM Design Guide," which was filed on Sep. 4, 2008, and to U.S. patent application Ser. No. 12/331,050, entitled "Timing Recovery for Optical Disc Drive High Frequency Modulation," which was filed on Dec. 9, 2008, and which, in turn, claims priority to U.S. Provisional Patent Application Ser. No. 61/015,432, entitled "Blu-Ray HFM Design Guide," which was filed on Dec. 20, 2007, the entire disclosures of which are hereby incorporated by reference herein.

FIELD OF THE TECHNOLOGY

The disclosure relates generally to non-volatile optical medium storage devices and, more particularly, to techniques for timing recovery and decoding of a high frequency modulation (HFM) signal in a Blu-Ray optical disc drive system.

DESCRIPTION OF THE RELATED ART

Nonvolatile optical data storage systems include compact disc (CD) systems, digital versatile disc (DVD) systems and, more recently, Blu-ray Disc (BD) systems. Each system generally has its own microprocessor, external buffer and flash memory to handle both temporary data storage and control code storage.

An optical data storage control system generally includes a buffer that stores read data, write data and/or volatile control code that is associated with the control of the system. Flash memory can also be used for critical data such as data relating to write formats and/or other nonvolatile control code. The optical data storage control system may also include a microprocessor of a computing system such as a server, a personal computer, a personal digital assistant (PDA), etc., or of a consumer electronics device such as a gaming system, etc., to allow the microprocessor to store data to and read data from the optical disc. The microprocessor may perform data and/or control processing that is related to the operation of the system. The microprocessor also performs decoding of copy protection and/or compression/decompression as needed. An input/output interface receives data to be written to the optical disc and transmits data read from the optical disc. A control module communicates with the input/output interface and with a spindle/feed motor (FM) driver and/or a read/write channel (RCW) device. The control module coordinates control of the spindle/FM driver, an actuator controller, the read/write channel device and the microprocessor and data input/output via the interface. Additionally, the RWC device may be coupled to the actuator controller. The RWC device may include a read channel device.

An optical data storage assembly includes an optical platter or disc that stores data optically. During write operations, the read/write channel module encodes the data to be written by an optical read/write (ORW) or optical read only (OR) device to the optical disc. During read operations, the read/write channel module converts an analog output of the ORW or OR device to a digital signal. The converted signal is then detected and decoded by known techniques to recover the data that was written on the optical disc.

The optical disc is rotated by a spindle motor at a controlled and/or variable speed during the read/write operations. The ORW or OR device moves relative to the disc to read and/or write data to/from the disc. A moving arm may be coupled to an actuator that may be used to position the ORW or OR device over the optical disc. The RWC device is coupled to the ORW or OR device and the actuator controller is coupled to the actuator.

The ORW or OR device typically includes a laser and an optical sensor. For read/write and read only systems, the laser is directed at tracks on the disc that contain lands and pits during read operations. The optical sensor senses reflections caused by the lands/pits. The spindle/FM driver controls the spindle motor, which controllably rotates the disc. The spindle/FM driver also generates control signals that position the feed motor, for example using a voice coil actuator, a stepper motor or any other suitable actuator. The feed motor typically moves the ORW or OR device radially relative to the disc. A laser driver generates a laser drive signal based on an output of the read/write channel module.

Portions of the optical data storage system may be implemented by one or more integrated circuits (IC) or chips. For example, the microprocessor and the control module may be implemented by a single chip. The spindle/FM driver and/or the read/write channel module may also be implemented by the same chip as the microprocessor, the control module and/or by additional chips.

The optical disc stores digitally encoded data in the lands and pits within tracks or spiral grooves that run from the center of the disc to the outer edge of the disc. The ORW or OR device reads the other side of the pits (i.e., bumps) to read the data. This form of encoding is sometimes referred to as a wobble groove. The more pits and lands that may be provided in the wobble groove, the more data that may be encoded on a disc. Generally, this means smaller pits (bumps) and lands, and more precise lasers. Blu-ray Disc systems, for example, utilize a "blue" laser having a wavelength (e.g., 405 nanometers) shorter than that of previous optical data storage assemblies (e.g., 650 nanometers), such as CD or DVD. In turn, a Blu-ray disc may have pits that are much smaller than those of a CD or DVD, and therefore store more data. However, this requires that the data from the disc must be read and decoded more precisely.

Recovering and matching the timing of the signal from the optical disc is one area in which errors in reading and decoding data may occur, particularly with high frequency modulated (HFM) data. High frequency modulation is a format generally used for control information, but not for the user data. Generally, data is encoded at a set spacing in the spiral groove, where the spacing is set according to a specified channel clock. This spacing or channel clock corresponds to the actual timing of the signal read from the disc. For example, in Blu-Ray, the control information is engraved to the groove walls using the HFM format or specification. The HFM signal specification for Blu-ray discs utilizes a standard channel clock, T, and the data pattern on the disc uses 36T spacing to encode each bit for bi-phase modulated data, and 18T spacing to encode each channel bit. The optical data storage control system calculates the expected channel clock or timing based on the rotation speed of the disc as controlled by the spindle/FM driver and the diameter of the track being read. However, this calculation is not always accurate, particularly due to jitter that may occur from off-center (elliptical) rotation and/or variations in speed. As such, the optical data storage control system employs timing recovery techniques to recover the actual signal timing, as opposed to relying solely on the calculated or expected timing. Whereas past timing recovery techniques could sometimes recover the actual timing if the expected timing was within 8% of the actual timing, the techniques did not always recover the timing quickly enough or often enough. If the actual timing was not resolved quickly enough or often enough, the expected timing error would be outside the recoverable range of the actual timing, thereby resulting in interruption in the decoding operation.

SUMMARY

In one embodiment, a method of recovering clock timing from a bi-phase modulated portion of a high frequency modulation (HFM) signal is disclosed. The HFM signal includes signal transitions between a high level and a low level. The method includes initiating a clock count upon detection of a first signal transition in the bi-phase modulated portion of the HFM signal, stopping the clock count upon detection of a second signal transition in the bi-phase modulated portion of the HFM signal subsequent to the first signal transition, identifying a first expected clock count between signal transitions of the bi-phase modulated portion of the HFM signal if the actual clock count between the first and second signal transitions falls within a first range of clock counts and determining a first error between the actual clock count and the first expected clock count, and identifying a second expected clock count between signal transitions of the bi-phase modulated portion of the HFM signal if the actual clock count between the first and second signal transitions falls within a second range of clock counts and determining a second error between the actual clock count and the second expected clock count. The clock count corresponds to an expected clock timing of the HFM signal. An actual clock count includes a number of clock cycles occurring between the first and second signal transitions based on the expected clock timing.

In another embodiment, a timing recovery and decoding apparatus for a high frequency modulation (HFM) signal is disclosed. The apparatus includes a signal transition assembly configured to detect signal transitions in a readback signal read from an optical disc and output a trigger signal when a signal transition is detected, a counter configured to count a number of clock signals between transitions between the high and low levels of the readback signal according to an expected clock timing of the HFM signal, a multiplier assembly configured to multiply a sampled readback signal with a sign of a signal transition in the sampled readback signal, and a range determination assembly coupled to a clock count output from the counter and coupled to a product output from the multiplier assembly, and configured to determine if the clock count falls within a range of clock counts corresponding to an expected clock count between signal transitions in a bi-phase modulation portion of the HFM signal, and to determine a first error between the clock count and the expected clock count, or utilize the product output as a second error in the clock count if the clock count output is equivalent to the expected clock count. The readback signal includes a waveform that transitions between high levels and low levels. The counter is triggered to reset and begin each count in response to the trigger signal. The sign includes digitized data corresponding to high levels and low levels in the sampled readback signal.

DETAILED DESCRIPTION

While the HFM detection and timing recovery technique described herein are disclosed as being used in optical drive systems that use one or more Blu-Ray Disc format specifications (e.g., Blu-ray Disc Rewritable Format Version 1.0; Rewritable (BD-RE) Formats RE 1.x, RE 2.x, RE 3.x; Recordable (BD-R) Formats R 1.x, R 2.x; Read-Only (BD-ROM) Format ROM 1.x; and AVCREC), these techniques may be used in various other types of optical drive systems that utilize high frequency modulation and are not limited to those conforming to one or more of the Blu-Ray Disc format specifications.

Figure 1:
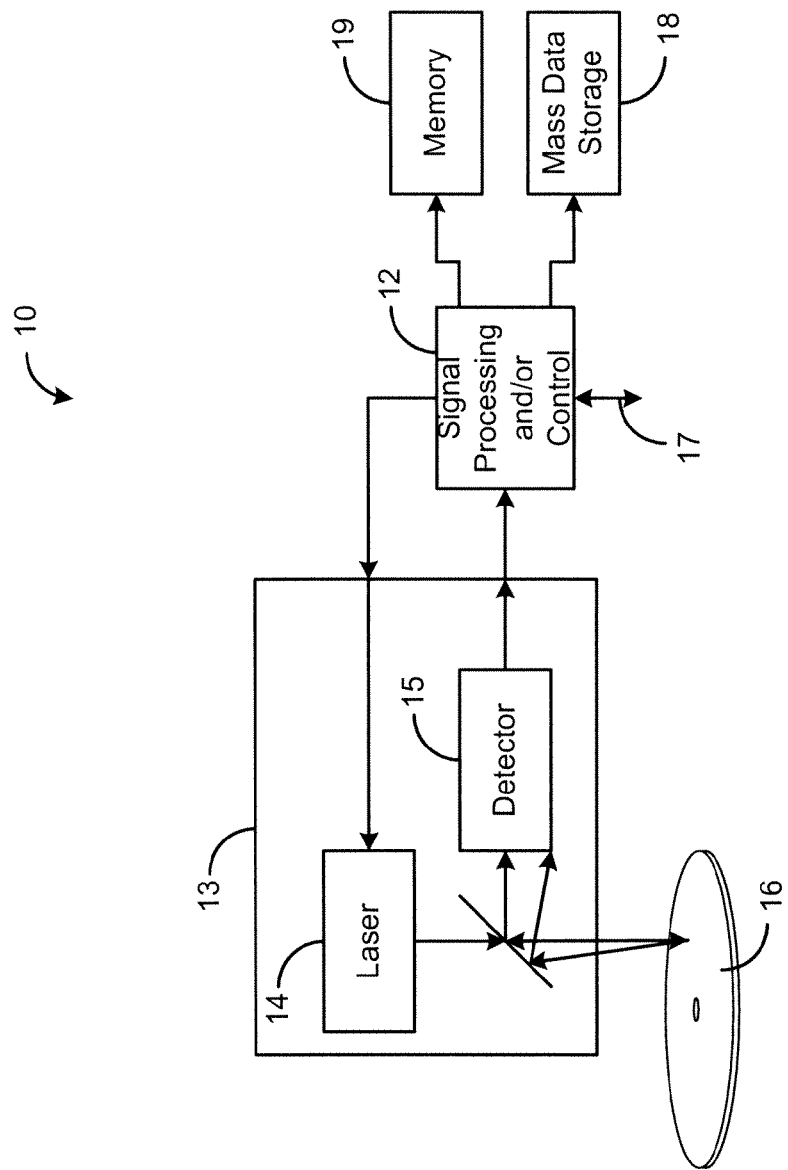
FIG. 1 is a block diagram of an example Blu-ray optical disc drive system to read data from a Blu-ray Disc.

Referring now to FIG. 1, an optical data storage system 10 is shown, which, in particular, is provided as a Blu-ray optical data storage system 10. In one example, the optical data storage system 10 may be part of a Blu-Ray digital versatile disc (DVD) drive, as may be found in a DVD player, a DVD drive of a personal computer or laptop computer, or any of a number of devices and appliances that may use DVD drives generally and/or Blu-Ray optical disc drives in particular. As described further below, the timing recovery and decoding techniques may be implemented by either or both signal processing and/or control circuits, which are generally identified in FIG. 1 at block 12, and/or a mass data storage 18 of optical data storage system 10. The signal processing and/or control circuit 12 and/or other circuits (not shown) in the optical data storage system 10 may process data, perform (de)coding and/or encryption, perform calculations, and/or format data that is read from and/or data written to an optical storage medium 16, such as a Blu-Ray Disc.

Data may be read from and/or written to the optical storage medium 16 using an optical pickup head assembly 13. Generally, the optical pickup head 13 includes a laser 14, such as a laser diode, laser diode array or other laser assembly, and a detector 15, such as a photodiode detector or other optoelectronic sensor. The electronics in the drive interpret the changes in reflectivity in order to read the bits that make up the bytes. It should be understood that the optical pickup head assembly 13 may include a laser driver (not shown) which may be integrated with the laser 14. If the optical data storage system 10 is implemented as a Blu-Ray optical disc drive system, the laser 14 emission has a wavelength of 405 nanometers.

The laser 14 may be controlled by the signal processing and/or control 17 to write data to the optical storage medium 16 and/or to read data from the optical storage medium 16 by focusing the laser emission on the optical storage medium 16 using a lens or lens assembly (not shown). In the example of a Blu-Ray Disc and other optical discs, the laser light is focused on a single, continuous spiral groove or track of the optical storage medium 16, which runs from the center of the disc to the edge of the disc. The light emission reflects off of microscopic wobble paths (microscopic bumps and lands) formed within the groove of the spiral track. The reflection off the bumps is different than that off the lands, and the detector 15 detects the changes in reflection as a readback signal.

The readback signal from the detector 15 is interpreted and processed by the signal processing and/or control circuit 12 as bits and bytes of data. Specifically, the signal processing and/or control circuit 12 samples the readback signal according to the timing, T, of the signal. That is, the signal processing and/or control circuit 12 accounts for the rotation (spindle) speed of the optical storage medium 16, which corresponds the timing of the signal received by the optical data storage system 10. Due to jitter from the rotation of the optical storage medium 16, the rotation speed may vary and/or the rotation of the optical storage medium 16 may be off-center, thereby resulting in an elliptical rotation, rather than a circular rotation. The signal processing and/or control circuit 12 may account for the off-center rotation using radial tracking to prevent track skipping (i.e., prevent the laser focus from skipping over the spiral track instead of along the spiral track). Even with radial tracking and constant spindle speed, the timing of the signal may appear to vary depending on the radius of the groove. For example, the signal timing may appear slower when reading a groove having a smaller radius (e.g., towards the center of the disc), and may appear faster when reading a groove having a larger radius (e.g., towards the outer edge of the disc). Accordingly, the signal processing and/or control circuit 12 recovers the timing of the signal in order to properly decode the data. In some implementations, the signal processing and/or control circuit 12 and/or other circuits (not shown) in the optical data storage system 10 can also perform other functions such as encoding and/or decoding and/or any other signal processing functions associated with an optical disc drive. As discussed in further detail below, one of these functions may include the disclosed HFM timing recovery and decoding techniques.

The optical data storage system 10 may communicate with an output device (not shown) such as a computer, television or other device via one or more wired or wireless communication links 17. The optical data storage system 10 may communicate with the mass data storage 18 that stores data in a nonvolatile manner. The mass data storage 18 may include a hard disk drive (HDD). The HDD may be a mini HDD that includes one or more platters having a diameter that is smaller than approximately 1.8". The optical data storage system 10 may be connected to memory 19, such as RAM, ROM, low latency nonvolatile memory such as flash memory, and/or other suitable electronic data storage.

The structure of the optical storage medium 16, in the example of a Blu-Ray Disc, includes various areas or zones on the disc, including a clamping area, a transition area, an information area, and an outer rim area, which are arranged from the center of the disc to the edge of the disc, respectively. The clamping area, transition area and outer rim area are well-known to those of ordinary skill in the art, and need not be described further herein.

The information area is formatted into a burst-cutting area (BCA) and an information zone. The information zone is divided into three parts: the lead-in zone, the data zone and the lead-out zone, arranged in a direction from the center of the disc towards the edge of the disc, respectively. The lead-in zone, in turn, may include various parts, such as a first guard/protection zone, a permanent information and control (PIC) data zone, a second guard/protection zone, an information zone, an optimum power calibration (OPC) zone, a reserved zone and a second information zone, again arranged in a direction from the center of the disc towards the edge of the disc, respectively. The lead-out zone may include various parts, such as a disc information zone and a guard/protection zone, arranged in a direction from the center of the disc to the edge of the disc, respectively. The lead-out area may be used for rewritable data, in the case of a rewriteable disc (e.g., BD-RE).

The data area between the lead-in and lead-out areas is generally reserved for the user data, such as audio/visual data in the case of a Blu-Ray DVD. The user data is recorded in the data area in tracks of wobbled grooves. That is, data recorded in the data area is aligned and recorded in standard wobble-shaped grooves. The wobble grooves of the data area is generally understood by those of ordinary skill in the art, and need not be described further herein.

The lead-in area contains embossed high frequency modulation (HFM) grooves and rewritable (i.e., tracks of wobbled grooves) control information, and an area for disc and drive testing. When reading the HFM groove, the optical pickup head assembly 13 generates an HFM signal from the reflections off the bumps and lands of the wobble groove. In one example, the HFM signal is a groove signal carried by a radial push-pull (RPP) signal, which controls the radial position of the optical pickup head assembly. Because HFM is a groove signal, the analog path for detection of the HFM is similar to that of an RPP or wobble signal, which uses a rectangular or square-wave modulation, rather than sinusoidal modulation. An RRP signal is known by those of ordinary skill in the art and need not be described further herein.

The data in the HFM grooves is recorded in 4000 partitions in the PIC data area, and the partitions are referred to as PIC clusters. Generally, the data in the HFM grooves provides the error correction code (ECC) information for the HFM blocks. In particular, the data in the PIC data area includes the important permanent disc information encoded in the HFM wobbled groove. For example, the PIC data area may include all of the necessary writing information to be used by the host, such as writing power, disc information, etc., which is encoded by HFM. Accordingly, the HFM signal is read and decoded, with the information sent to the host, so that the host may use the information in its own writing processes.

As disclosed further below, the wobble-shaped encoding involves bi-phase modulation, whereby channel bits are encoded by deviating the HFM groove from the average groove center. In bi-phase modulation, the groove is partitioned into bit cells of 36T (i.e., the length of the bit cell), where T corresponds to the channel clock or timing of the HFM signal. As discussed above with respect to the signal processing and/or control circuit 12, the readback signal from the detector 15, which corresponds to the HFM signal when reading an HFM groove, is sampled according to the timing, T, of the signal. The HFM detection and timing recovery technique provide a mechanism to recover the signal timing, T, and the signal processing and/or control circuit 12 uses this signal timing to read and decode the data from the HFM signal. It should be understood by those of ordinary skill in the art that while the bit cell lengths are often standardized such that the disc may be used with different optical disc drive systems, bit cell lengths different than 36T may be utilized without affecting the HFM detection and timing recovery technique described herein.

Figure 2:
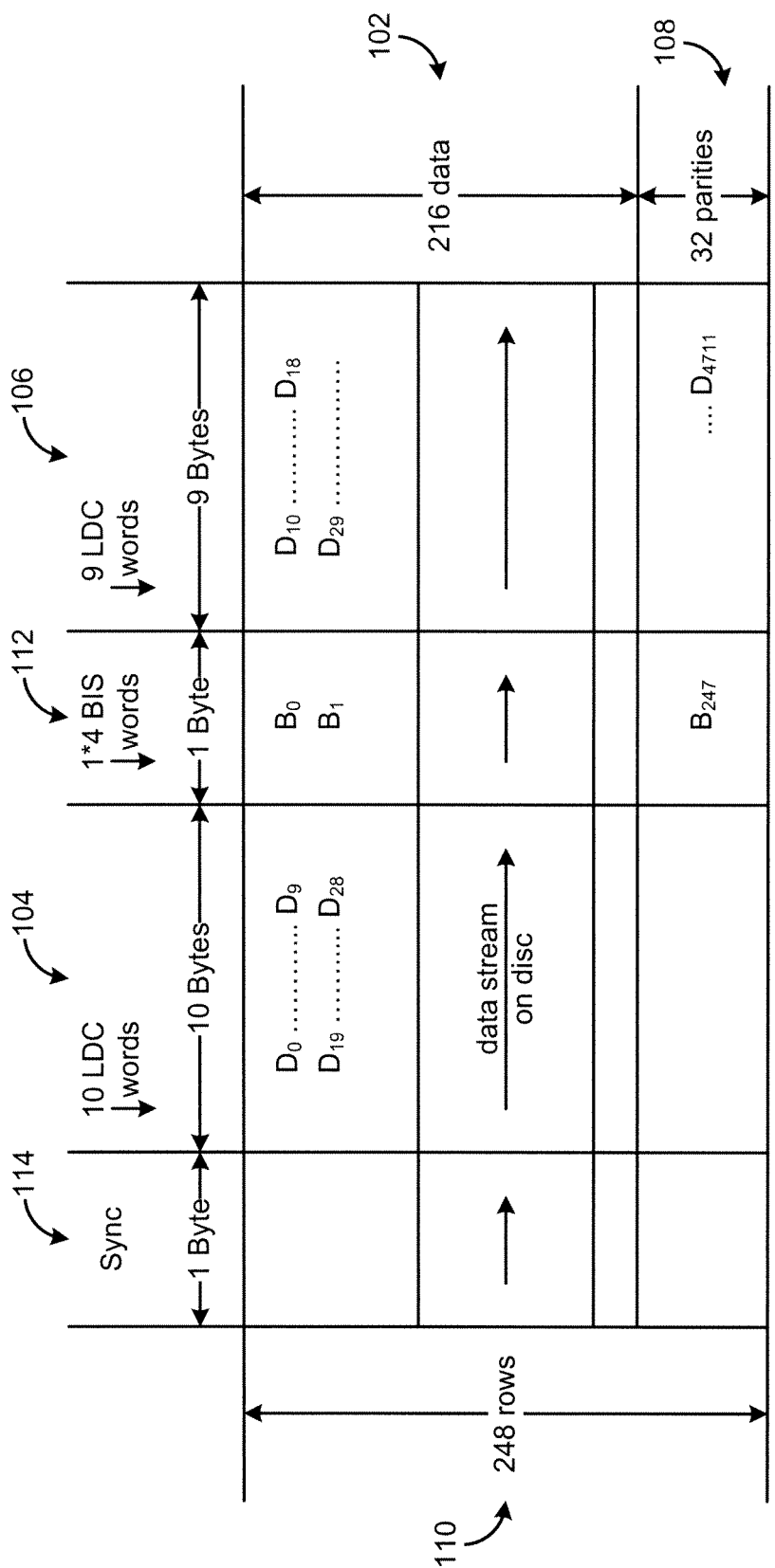
FIG. 2 is a schematic diagram of a related prior art data structure in a permanent information and control (PIC) cluster of a Blu-ray Disc.

Generally, each PIC cluster contains two data frames, each with 2048 bytes of data. FIG. 2 is an example of a prior art data structure in a permanent information and control (PIC) cluster of a Blu-ray Disc. Referring to FIG. 2, each data frame is extended with a 4-byte error detection code (EDC) and scrambled. The two scrambled data frames are mapped into a data block of 216 rows 102 by nineteen 1-byte columns 104, 106 ($D_0 \ldots D_9, D_{10} \ldots D_{18}, \ldots$) and transformed into a long distance code (LDC) block by adding 32 parity rows 108 for error correction coding. Address and control data for the PIC are reordered into a burst-indicating subcode (BIS) cluster of 248 rows 110 by a single 1-byte column 112. The PIC cluster is obtained by multiplexing an LDC block and a BIS cluster. Each PIC recording frame is converted into modulated bits by applying bi-phase modulation.

Figure 3:
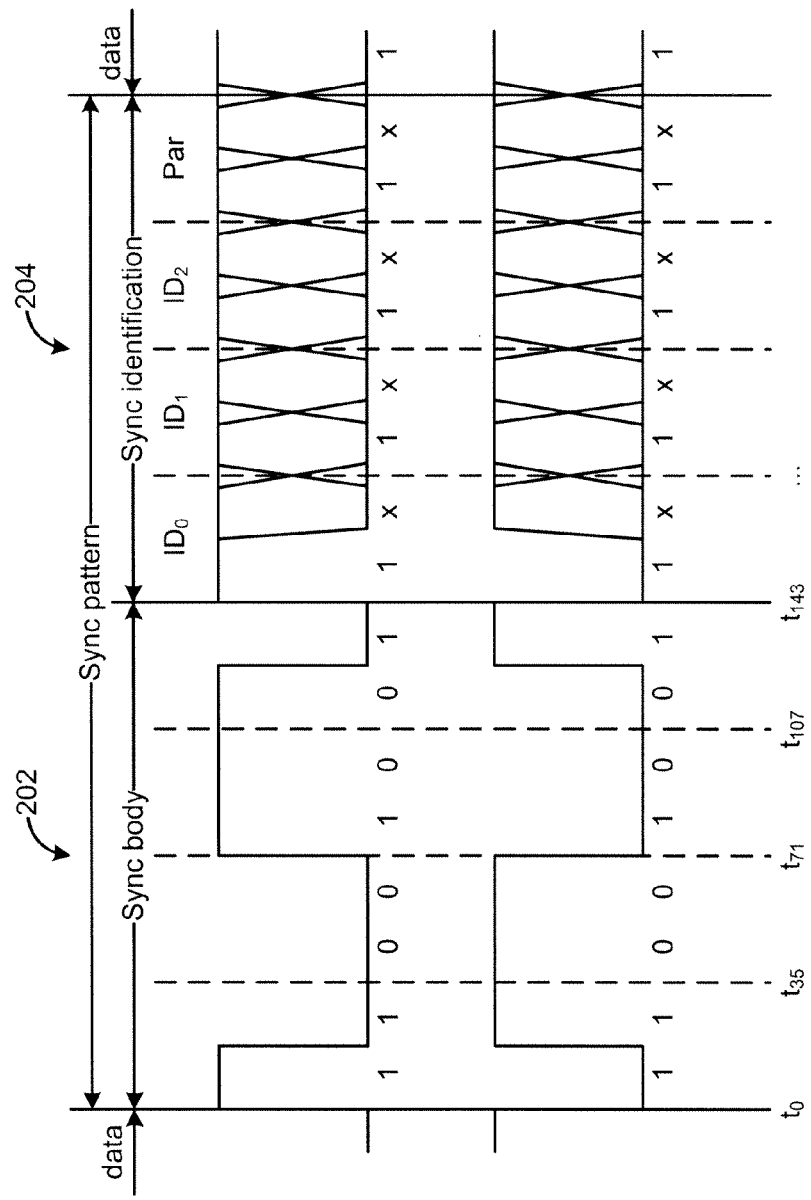
FIG. 3 is a schematic diagram of a related prior art synchronization pattern in a PIC cluster of a Blu-ray Disc.

Also contained within the PIC cluster are synchronization patterns ordered into a block of 248 rows 110 by a single 1-byte column 114, which precedes each frame in the PIC cluster. FIG. 3 is a schematic diagram of a bi-phase synchronization pattern used in the PIC cluster of FIG. 2. Referring to FIG. 3, the synchronization pattern includes a synchronization body 202 and a synchronization identification 204. Keeping with the description of bi-phase modulation, the synchronization pattern is partitioned into eight bit cells of length 36T. However, in this synchronization pattern, only the synchronization identification 204 signal is bi-phase modulated. A brief description of bi-phase modulation is provided further below.

The synchronization body 202 is provided as a predetermined synchronization data pattern, in this case an 8 channel bit data pattern of "11001001," with each channel bit corresponding to a transition in the HFM wobble groove of the synchronization pattern provided on the disc. That is, when the pickup head 13 of the optical data storage system 10 scans the HFM wobble groove corresponding to the synchronization body 202, the reflection angle of the light reflection off the groove will vary according to the deviations (bumps/lands) from the centerline of the groove, where each variation in reflection angle corresponds to a signal transition. The detector 15 detects these signal transitions by detecting the difference in the reflection angle, for example, by detecting changes in the phase or intensity of the light reflection from disc's surface. The light reflection detected by the detector 15 is provided as an analog signal or waveform corresponding to the wobble groove (e.g., analog wobble path). The optical data storage system 10 interprets these signal transitions according to channel bits.

In the synchronization body 202, a channel bit value "1" is represented by a signal transition in the waveform as compared to the waveform of the preceding channel bit, and a channel bit value "0" is represented by no signal transition in the waveform as compared to the waveform of the preceding channel bit. For example, as seen in FIG. 3, the waveform corresponding to the first channel bit (e.g., high) begins with a signal transition as compared to the waveform corresponding to the previous channel bit (e.g., low), thereby providing a first channel bit of "1" for the synchronization data pattern due to the signal transition. The waveform (high) then transitions in the next channel bit (low), thereby providing a second channel bit of "1." The waveform for the channel bit thereafter (low) does not involve a signal transition, so the third channel bit is "0." The synchronization waveform continues with signal transitions or no signal transitions according to the wobble groove and waveform corresponding to the synchronization data pattern "11001001." As seen in FIG. 3, the lower waveform is a mirrored version of the upper waveform, but the signal transitions result in the same synchronization data pattern. This predetermined synchronization data pattern and waveforms are recognized by the optical data storage system 10, which reads and interprets the synchronization body as the beginning of the PIC data frame. The HFM detection and timing techniques includes an example of how the optical data storage system 10 can detect the synchronization data pattern.

As noted above, unlike the synchronization identification 204, the synchronization body 202 is generally not bi-phase modulated. Instead, in order for the optical data storage system 10 to find the synchronization pattern, the waveform read from the detector 15 is decoded and interpreted by the optical data storage system 10 according to the channel bit information, and not the bi-phase modulated data. In particular, the synchronization waveform may include signal transitions within a 36T bit cell that correspond to channel bits of either "11" or "01." However, the bit cell values for bi-phase modulation correspond to transitions within the 36T bit cell with each bit cell beginning with a transition from the previous bit cell (i.e., the first channel bit of a channel bit pair for a 36T bit cell is a "1"). Accordingly, for those bit cells that include a transition between the first channel bit and the second channel bit (i.e., "11"), the bi-phase modulation results in a bit cell value of "1" due to the signal transition in the bit cell, and does not differentiate between "11" or "01," each of which indicates a transition between the first and second channel bit in the channel bit pair. Likewise, the synchronization waveform may include no signal transitions within a 36T bit cell, which correspond to channel bits of either "00" or "10," and the bi-phase modulation bit cell value of "0" does not differentiate between "00" or "10." In effect, an 8 channel bit synchronization data pattern of "11001001" is "1001" in bi-phase modulation, which is generally not unique enough to differentiate from other data. As such, the synchronization body is not bi-phase modulated.

On the other hand, the synchronization identification 204 is bi-phase modulated, as is the user data in the following the synchronization pattern. The synchronization identification 204 is provided as three single-bit identification codes $ID_0$, $ID_1$, and $ID_3$, and one single-bit parity code (PAR). The synchronization identification 204 of FIG. 3 is shown without any values for the three single-bit identification codes $ID_0$, $ID_1$, and $ID_3$, and one single-bit parity code (PAR), though it is noted that each bit cell begins with a signal transition from the previous bit cell, thereby giving a first channel bit of "1" to indicate the signal transition at the start of the bit cell (i.e., 1x). The second channel bit value depends on the value of the respective identification code $ID_0$, $ID_1$, $ID_3$, or parity code (PAR), and particularly the signal transition, or lack thereof, from the first channel bit to the second channel bit within each corresponding channel bit pair for a bit cell. The identification codes $ID_0$, $ID_1$, and $ID_3$, and parity code (PAR) are bi-phase modulated, with a "1" or "0" associated with each bit cell, where a "1" in hi-phase modulation corresponds to "10" due to the signal transition in the bit cell between channel bits "1" and "0," and a "0" in hi-phase modulation corresponds to "11" due to the lack of signal transition in the bit cell between channel bits. The hi-phase modulation bits may be referred to as the "user bits" of the disc. Accordingly, using a 36T bit length, a user bit "1" has a clock count of 17 clocks (cycles) between transitions, and a user bit "0" has a clock count of 35 clocks between transitions, where the clock count begins at zero (e.g., $t_0 \ldots t_{17} \ldots t_{35}$).

Figure 4:
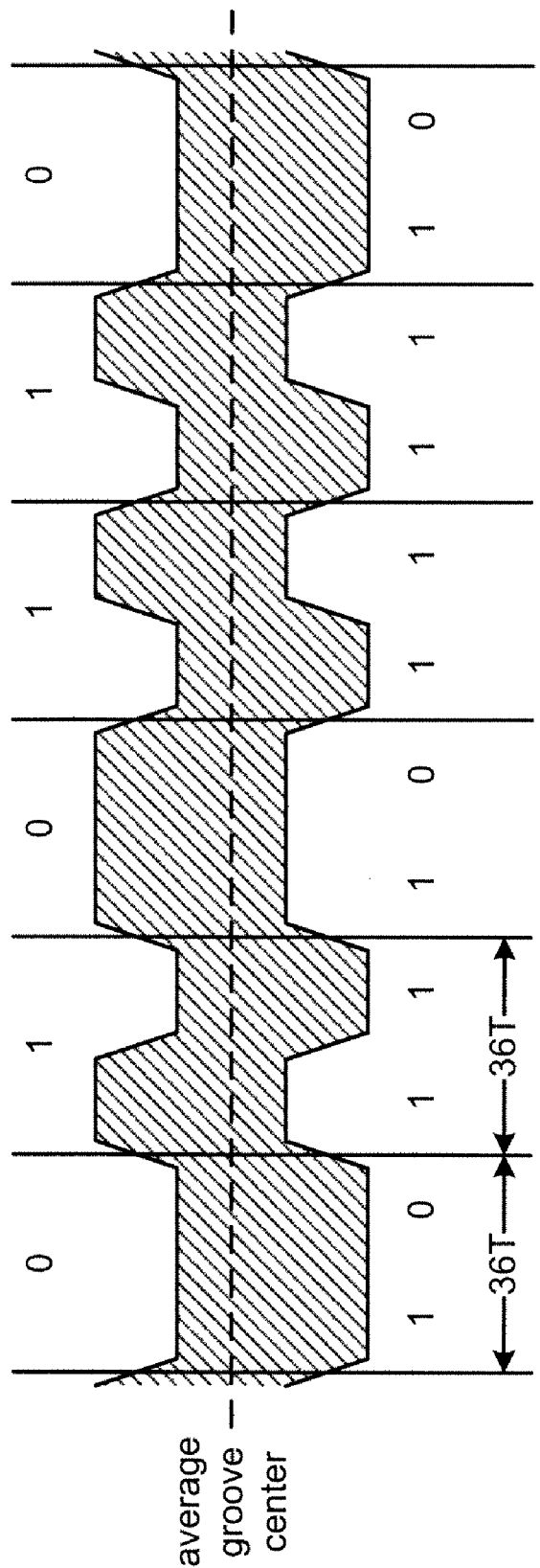
FIG. 4 is an illustration of a related prior art bi-phase modulated high frequency modulation wobble groove in a Blu-ray Disc.

The concept of bi-phase modulation with respect to the HFM wobble groove of the disc (and corresponding waveform of the readback signal) is shown in FIG. 4. The HFM groove stores the PIC data, including the synchronization patterns discussed above. Again, each bit cell has a length of 36T, and a bit cell corresponds to the spacing used to encode a "1" or a "0" bit as shown above the wobble groove of FIG. 4. Data is provided by having the centerline of the HFM groove deviate from an average groove center according to the bi-phase modulation. In the channel bits (shown below the wobble groove), each "1" or "0" bit corresponds to a transition in the signal, where a "1" bit indicates a signal transition, and a "0" bit indicates no signal transition. For bi-phase modulation, each bit cell of 36T begins with a signal transition as compared to the second channel bit of the previous bit cell. The value associated with the bit cell is then dependent upon the occurrence or non-occurrence of a signal transition in the middle of the bit cell. That is, a transition from a high level to a low level, or from a low level to a high level. In bi-phase modulation, a bit value of "0" is represented by a signal transition at the start of a bit cell, and no signal transition until the start of the next bit cell (i.e., channel bits "10" or no signal transition for 36T). A bit value of "1" is represented by a signal transition at the start of the bit cell and in the middle of the bit cell (i.e., channel bits "11" or a signal transition at 18T). It should be understood that while the terms "high" and "low" are used to distinguish the differences in the waveform of the readback signal, which corresponds to the waveform of the HFM wobble groove, these terms are exemplary only and should not be construed as necessarily referring to a representative value of the readback signal or structure of the HFM wobble groove.

The variations or deviations in the groove from the average groove center correspond to the waveform of the readback signal read by the optical data storage system 10. Referring to FIG. 4, the mean of the area above and below the average groove center (apart from noise) may be determined in order to read the highs and lows of the wobble signal. For example, an analog-to-digital converter (ADC) samples the readback signal according to the expected signal or clock timing, T. In the wobble groove of FIG. 4, the optical data storage system 10 should read a "low level" for 36 T, a "high level" for 18T, a "low level" for 18T, a "high level" for 36T, and so on. However, without knowing the signal timing, T, the ADC is unable to accurately sample the signal and the optical data storage system 10 is unable to decode the signal. Further, the variations in spindle speed, off-center rotation, etc. may cause the timing, T, to change, thereby requiring the optical data storage system 10 to quickly and regularly recover the timing, T, with enough frequency to accurately sample and decode the signal.

In order to read and decode the HFM signal, the HFM detection and timing recovery techniques utilize the signal transitions in the waveform in the readback signal corresponding to the bi-phase modulated data to recover the timing of the HFM signal and decode the HFM signal. By detecting the signal transitions in the bi-phase modulated data, the HFM timing may be recovered more quickly as compared to relying solely on the signal transitions in the waveform of the synchronization body 202.

In one respect, when recovering the timing from the signal transitions in the synchronization body, some signal transitions may not occur for approximately 54T clocks. Referring to FIG. 3, there are two such instances in the synchronization body 202. In another respect, the occurrence of the synchronization body 202 is infrequent. The synchronization body 202 occurs at the beginning of each data frame in the PIC cluster. Where a PIC cluster includes two data frames, each with 2048 bytes of data and a 4-byte EDC, which are mapped into a data block of 216 rows by 19 1-byte columns with a single 1-byte synchronization column and single 1-byte column of an address and control data, each synchronization body only occurs every 20 bytes, which corresponds to 168 bi-phase modulated user bits. With each bi-phase modulated user bit corresponding to 36T clocks, the timing is recovered every 6048 clocks. However, excessive jitter in the optical drive disc system 10 may exist between occurrences of the synchronization body 202 and between occurrences of signal transitions within the synchronization body 202, due to varying rotation speeds and/or off-center rotation. The jitter may lead to ADC sampling running too slow or too fast as compared to the actual timing of the HFM groove signal, which results in degraded performance in decoding and reading the HFM data from the disc.

The HFM detection and timing recovery techniques detect the signal transitions in the bi-phase modulated data, where each signal transition occurs at least every 36T in the case of a hi-phase modulated bit "0" and every 18T in the case of a bi-phase modulated bit "1". Referring again to FIG. 4 and to the synchronization identification 204 of FIG. 3, each bi-phase modulated bit (i.e., each bit cell) begins with a transition from the previous bit cell, and the value of the bi-phase modulated bit depends on the occurrence of a signal transition in the middle of the bit cell. Generally, the HFM detection and timing recovery technique look for signal transitions that are approximately 17 and 35 clocks apart (counting from 0 to 17, or 0 to 35), though it should be understood by those of ordinary skill in the art that the HFM detection and timing recover techniques may be modified to accommodate signal transitions having different signal transition intervals. The expected clock count is determined according to the expected signal timing, T, which corresponds to the sampling of the signal.

In particular, the HFM detection and timing recovery technique count the number of clocks between signal transitions in the hi-phase modulated data according to a clock that corresponds to the expected timing, T, of the HFM signal. Because the signal transitions may occur at two different times in the bi-phase modulated HFM groove (e.g., every 18T or every 36T), non-overlapping clock count ranges are established for each expected clock count (e.g., 17, 35). The clock count ranges include a corresponding expected clock count based on the expected timing of the HFM signal, and a subset of clock count deviations from the expected clock count. The clock count deviations are clock counts that are less than and more than the expected clock count, and the number of clock count deviations may be set according to the expected or probable range of errors in the timing, or as otherwise desired. For example, the clock count range for an expected clock count corresponding to an 18T transition may have clock count deviation of +/−10%. While the range parameters may be set according to any probability of error in the timing, the clock count deviation may be greater for larger expected clock counts. In particular, larger expected clock counts provide increased opportunity for jitter and increased timing errors. Accordingly, a larger range may be used for larger expected clock counts (e.g., +/−20% for 36T transitions).

As the HFM timing recovery and decoding techniques count the number or actual clocks between transitions as read from the readback signal, if the actual clock count between signal transitions falls within one of the clock count ranges, then the actual clock count corresponds to the expected clock count between signal transitions corresponding to that clock count range. The actual clock count is then compared with the expected clock count, and the difference is used to generate a phase error signal. The phase error signal represents how far off the timing is to the actual timing of the HFM signal, and is used to adjust the timing used to read the HFM signal. It is noted that the ranges for different expected clock counts between signal transitions (e.g., 18T and 36T) are non-overlapping in order to avoid conflicting timing errors. That is, if the ranges overlap and the actual clock count falls within the overlapping region, it is not known whether the actual clock count corresponded to the expected clock count for a bi-phase modulated bit "0" (e.g., 36T) or the expected clock count for a bi-phase modulated bit "1" (e.g., 18T). In the event the actual clock count does not fall within either range, the HFM detection and timing recovery technique may not make any determination of error in the expected clock timing.

Figure 5:
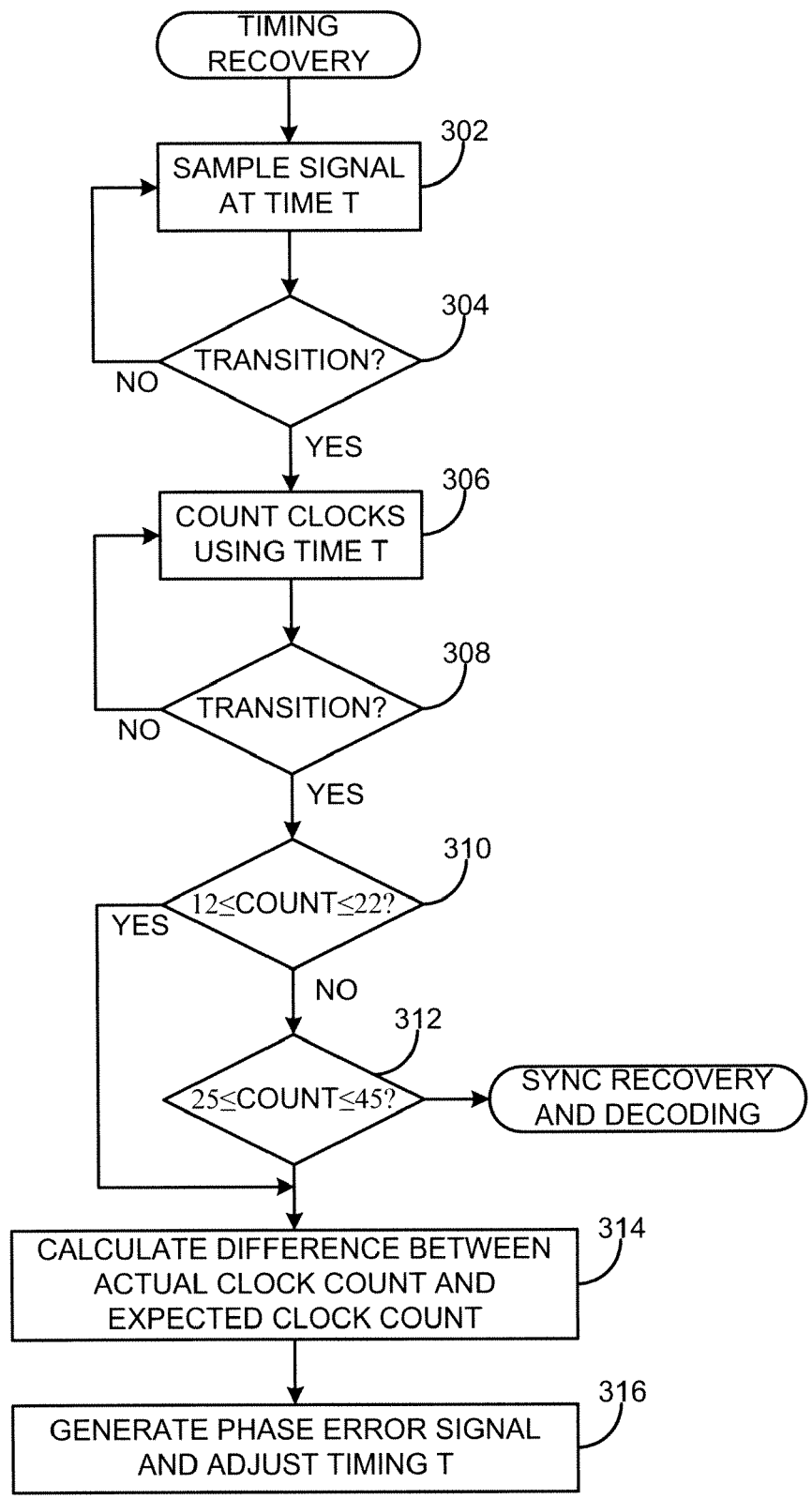
FIG. 5 is a flowchart of an example timing recovery routine which may be used to recover the HFM timing in a Blu-ray Disc.

FIG. 5 is an example flowchart of a timing recovery routine according to the above-described HFM detection and timing recovery technique, which may be implemented in the optical data storage system 10 in general, and in the signal processing and/or control 12 in particular. In this example, an optical data storage system 10 may seek signal transitions that are approximately 17 and 35 clocks apart (counting from 0 to 17, or 0 to 35), which correspond to 18T and 36T signal transitions, respectively, and which correspond to bi-phase modulated bits of "1" and "0," respectively. An expected clock count of 17 may have a range of 12 to 22 clock counts (i.e., clock count deviation of +/−5), and an expected clock count of 35 may have a range of 25 to 45 clock counts (i.e., a clock count deviation of +/−10).

Beginning at block 302, the readback signal is sampled according to the expected HFM signal timing, T, in order to read the highs and lows in the waveform. For example, referring to FIG. 4, the timing recovery routine may sample the readback signal and read a low level for 36T, before the transition to a high level. A block 304 may monitor the sampled signals for these transitions. If no signal transition is detected as determined at block 304, whether from high to low or low to high, the routine continues to sample the readback signal.

If a transition is detected as determined at block 304, at a block 306 the routine begins to count the number of actual clocks between signal transitions according to the expected signal timing, T, beginning with zero. The expected HFM signal timing may be based on the results of the previous timing recovery.

A block 308 may continue to monitor the sampled signals for a subsequent transition. If no signal transition is detected as determined at block 308, the routine continues to count the number of actual clocks. If a subsequent transition is detected as determined at block 308, the routine stops the clock count, which is used as the actual clock count between signal transitions, and determines whether the actual clock count corresponds to an 18T transition or a 36T transition by matching the actual clock count with the corresponding ranges.

Specifically, at a block 310, the routine determines whether the actual clock count falls within the range of 12 to 22 clock counts, which corresponds to an expected clock count of 17 (i.e., an 18T transition). If so, the routine proceeds to a block 314 to determine the error. If not, at a block 312, the routine determines whether the actual clock count falls within the range of 25 to 45 clock counts, which corresponds to an expected clock count of 35 (i.e., a 36T transition), in which case the routine proceeds to the block 314 to determine the error. In the event the actual clock count falls within neither range, the routine may pass control to a synchronization recovery and decoding routine, as disclosed further below and/or pass a count of zero to block 316.

At the block 314, the routine determines the difference between the actual clock count and the expected clock count according to the corresponding range. For example, if the actual clock count according to the expected clock timing between signal transitions is 19, the routine would have determined that it fell within the range of 12 to 22 clock counts at the block 310, thereby corresponding to an expected clock count of 17. At the block 314, the routine determines that the actual clock count of 19 results in an error of plus-2, indicating that the expected clock timing, T, is too fast. That is, there were too many clock counts (19) according to timing, T, when there were supposed to be only 17 clock counts. If the actual clock count was 16, it will also fall in the range of 12 to 22 clock counts at the block 310, and result in an error of minus-1 at block 314, indicating that the expected clock timing is too slow.

Likewise, if the actual clock count according to the expected clock timing between signal transitions is 40, it will fall in the range of 25 to 45 clock counts at the block 312, which corresponds to the expected clock count of 35. An actual clock count of 40 results in an error of plus-5 at the block 314, thereby indicating that the expected clock timing is too fast. If the actual clock count is 32, it will also fall in the range of 25 to 45 clock counts at the block 312, and result in an error of minus-3 at the block 314, thereby indicating that the expected clock timing is too slow. Once the difference between actual clock counts and expected clock counts is determined at block 314, the routine generates a phase error signal at block 316, which may be sent to a timing loop to generate or adjust the expected signal timing, T, to account for the error. In the event a zero is passed to block 316 as a result of the actual clock count falling within neither range, the zero is interpreted as no error in the timing which generates a phase error of zero, in order to avoid errors in the timing recovery.

In addition to the above-described technique for recovering the timing of the HFM signal, the HFM detection and timing recovery technique may be used to detect the synchronization pattern and decode the HFM signal. In particular, the counting of clocks between signal transitions may be used to detect the 54T signal transitions that are unique to the synchronization pattern, and, more particularly, the synchronization body 202, as compared to the bi-phase modulated data. For example, referring to FIG. 3, the channel bit patterns of "100" correspond to signal transitions that do not occur for 54T. As compared to the bi-phase modulated data which has a signal transition at least every 36T, the two instances of channel bit patterns of "100" are unique to the synchronization body 202. By searching for these patterns, the HFM detection and timing recovery technique is able to find the synchronization pattern and decode the readback signal to retrieve the HFM data.

Figure 6:
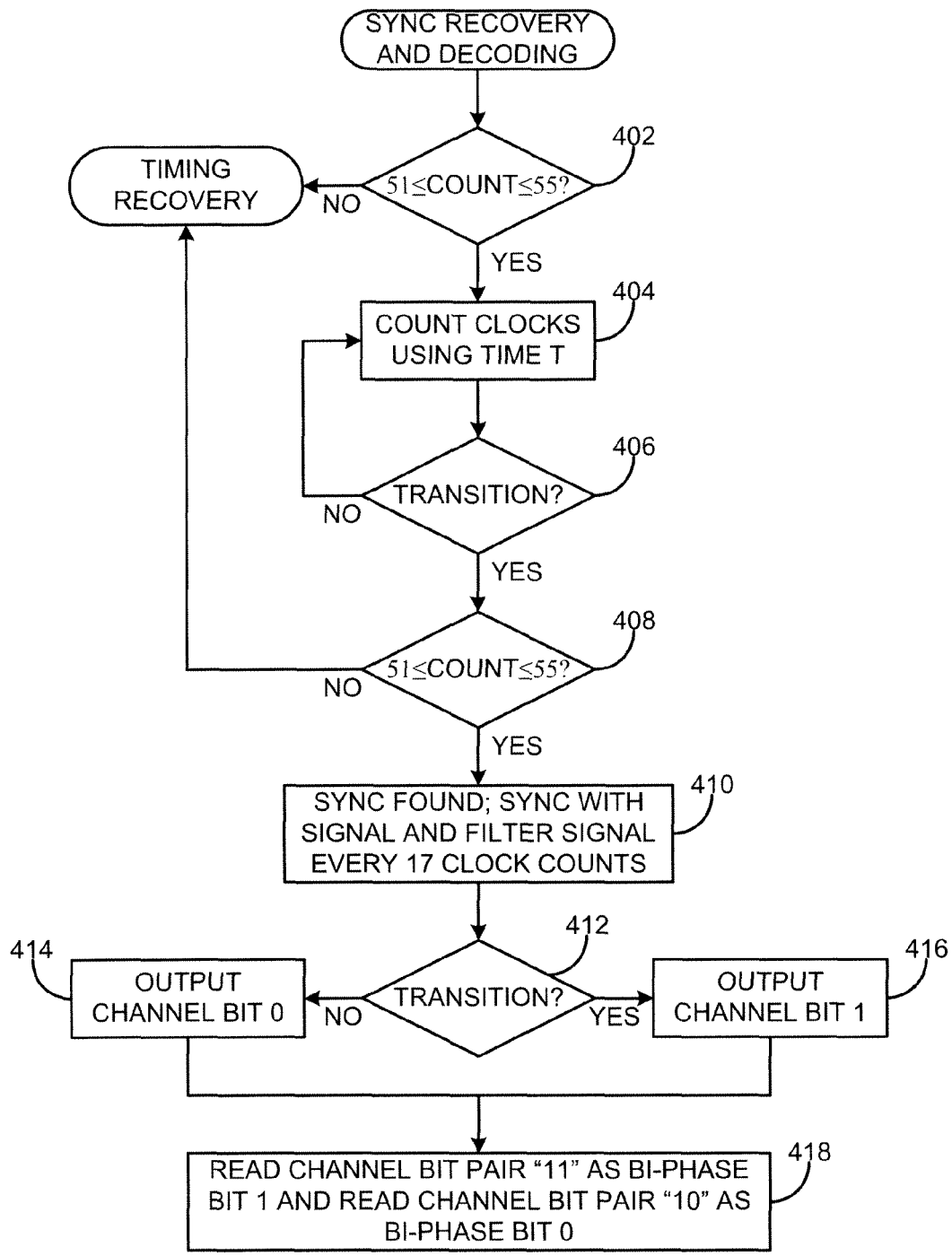
FIG. 6 is a flowchart of an example synchronization routine which may be used to recover a synchronization pattern unique to the HFM signal of a Blu-ray Disc and synchronize to the HFM signal.

FIG. 6 is an example flowchart of a synchronization recovery and decoding routine according to the above-described HFM detection and timing recovery technique, which may be implemented in the optical data storage system 10 in general, and in the signal processing and/or control 12 in particular. In this example, the routine searches for two instances of subsequent signal transitions occurring approximately every 54T. As seen with FIGS. 5 and 6, the synchronization recovery and decoding routine may be integrated with the timing recovery routine and utilize the results of the actual clock count from the block 306 if the actual count clock between transitions does not correspond with either a signal transition of 18T or 36T, though it should be understood that the synchronization and decoding routine may be implemented independent of the timing recovery routine. However, if integrated with the timing recovery routine or otherwise implemented before the timing of the HFM signal is recovered, the expected clock count of 53 (counting from 0 to 53 and corresponding to a 54T transition) may have a range of 51 to 55 clock counts (i.e., clock count deviation of +/−2) to account for errors in the timing. This range may be set accordingly to any probability of error, but is non-overlapping with the ranges used for the timing recovery in order to avoid conflicts.

Referring to FIG. 6, the routine begins at a block 402, for example, by having control passed from the block 312 of the timing recovery routine. At the block 402, the routine determines whether the actual clock count falls within the range of 51 to 55 clock counts, which corresponds to an expected clock count of 53 (i.e., an 54T transition). If the actual clock count does not fall within this range, then control may be passed back to the beginning of the timing recovery routine. Otherwise, the actual clock count corresponds to a first actual clock count, and the routine proceeds to a block 404 to count the clocks until the subsequent signal transition as part of a second actual clock count. At the block 408 the routine begins to count the number of actual clocks between signal transitions according to the expected signal timing, T, beginning with zero.

A block 406 may monitor the sampled signals for a subsequent transition or otherwise wait for the next clock count from the timing recovery routine. If no signal transition is detected as determined at block 406, whether from high to low or low to high, the routine continues to count the clocks at the block 404. If a transition is detected as determined at the block 406, then, at a block 408, the routine determines whether the second actual clock count falls within the range of 51 to 55 clock counts, which again corresponds to the expected clock count of 53 (i.e., a 54T transition). If the second actual clock count does not fall within this range, then the transitions do not correspond to the consecutive 54T transitions of the synchronization body 202, and control passes back to the beginning of the timing recovery routine. On the other hand, if the second actual clock count falls within the range of 51 to 55 clock counts, then the synchronization signal has been found as determined at a block 410.

At the block 410, the routine may automatically synchronize with the HFM signal and begin filtering the signal in clock count increments corresponding to the size of the channel bits (e.g., 17 clock counts). Specifically, the routine determines whether each 17 clock count sample corresponds to a high level or a low level. As discussed further with respect to FIG. 7, the clock count sample does not need to exactly correspond with the clock counts corresponding to the channel bits.

Consecutive clock count samples may be compared at a block 412 to detect transitions in the waveform of the HFM signal. If no signal transition occurs between clock count samples, either from a high level to a low level or vice versa, as determined at the block 412, then the channel bit output is "0" at a block 414. On the other hand, if the routine determines a signal transition has occurred between clock count samples, then the channel bit output is "1" at a block 416.

The channel bit outputs of the blocks 414 and 416 are passed to a block 418, where channel bit pairs may be interpreted according to bi-phase modulation, as seen in FIG. 4. In particular, having synchronized with the HFM signal, channel bit pairs having a value of "11" may be interpreted as corresponding to a bi-phase modulated bit "1." Likewise, channel bit pairs having a value of "10" may be interpreted as corresponding to a bi-phase modulated bit "0."

Figure 7:
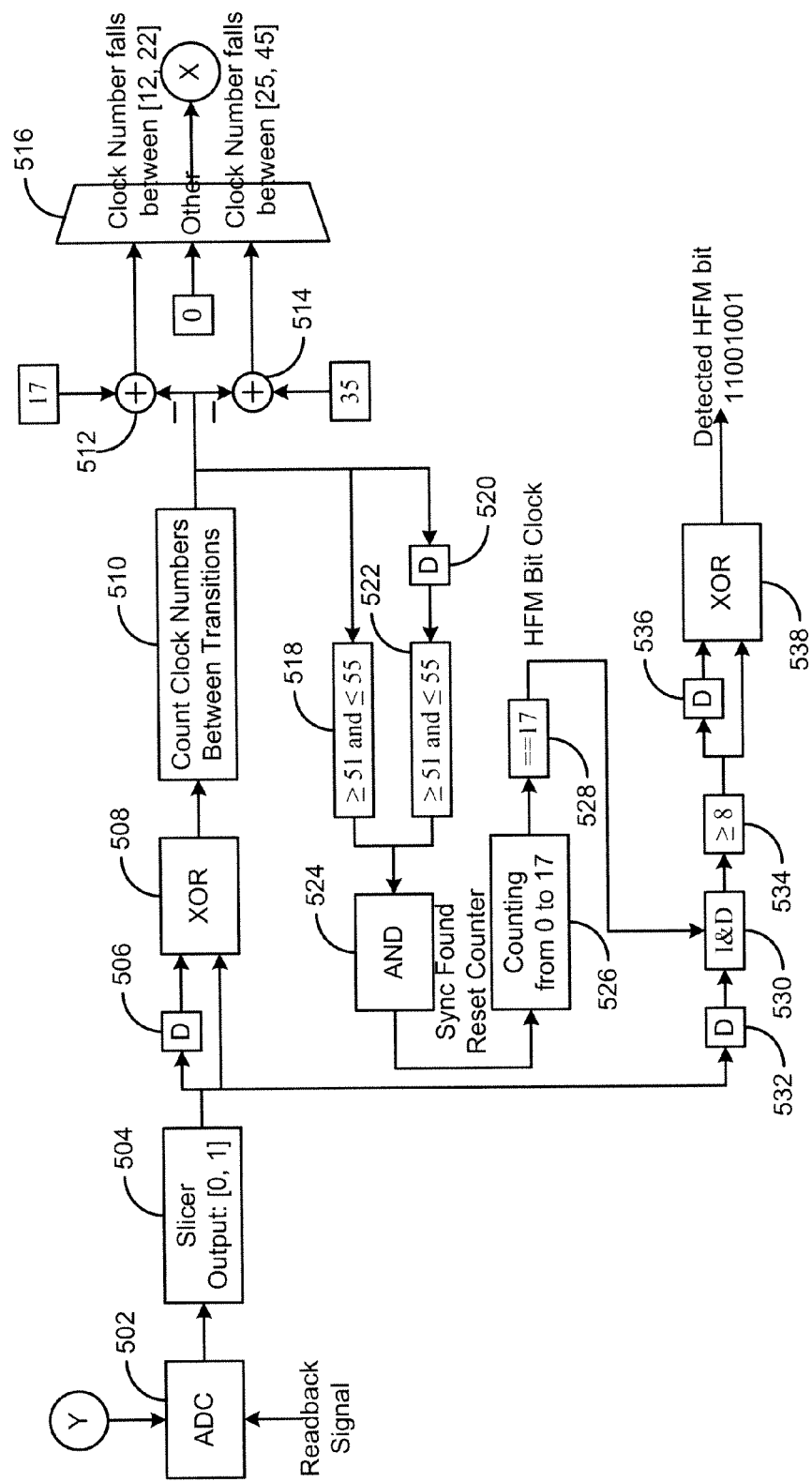
FIG. 7 is a block diagram of an example timing recovery and decoder circuit that implements timing recovering of the high frequency modulation signal to identify a timing error in recovering the HFM signal of a Blu-ray Disc.

While the HFM detection and timing recovery technique has been described with reference to routines, which may be implemented as software, firmware and the like, the routines may also be implemented as hardware. FIG. 7 is a block diagram of an example timing recovery and decoder circuit that implements the HFM detection and timing recovery technique disclosed above. The timing recovery and decoder circuit may be implemented in the optical data storage system 10, and, more particularly, may be implemented as a separate circuit, as part of the signal processing and/or control circuit 12 or any other circuit of the optical data storage system 10.

Referring to FIG. 7, the timing recovery and decoder circuit includes an analog-to-digital converter (ADC) 502 with an output coupled to a slicer 504. The ADC 502 converts the phase modulations from the pickup head into digital data by sampling the readback signal from the detector 15 according to timing intervals. The timing intervals correspond to the expected timing T of the HFM signal received by the optical data storage system 10, where the expected timing T is adjusted by the timing recovery and decoder circuit to compensate for errors as compared to the actual timing of the HFM signal. Ideally, each sample corresponds to a channel bit in the waveform, though timing errors may prevent this from being the case.

Although sampled at intervals of T, the phase modulations from the pickup head are generally sinusoidal, and the output of the ADC 502 is likewise sinusoidal. The slicer 504 (which may also be known as a clipper circuit, amplitude selector or limiter) removes portions of the waveform near the positive and negative peaks thereby converting the sinusoidal output from the ADC into outputs of "0" or a "1" for each sample, where the "0" may correspond to a low level in the waveform of the readback signal, and the "1" may correspond to a high level. Again, the terms "low" and "high" are simply to distinguish the differences in the waveform of the readback signal, which generally corresponds to the waveform of the wobble groove as imprinted on the track of the disc.

The output of the slicer 504 is provided to a signal transition detection assembly, which monitors and detects signal transitions in the readback signal. In this example, the signal transition detection assembly includes a delay element 506 and an exclusive disjunction element, such as an exclusive-or circuit (XOR) element 508. The output from the slicer 504 is split with one branch provided as an input into the delay element 506 and the other branch provided as an input to the XOR element 508. The output of the delay element 506 is provided as another input to the XOR element 508. In this example, the delay factor of the delay element 506 is set to T. With the signal transition detection of FIG. 7, the delay element 506 delays the one input to the XOR element 508, such that the values of consecutive samples may be compared. For example, if consecutive samples each have a value of "1" or "0" (i.e., XOR inputs of "11" or "00"), then no transition has occurred between the samples and the output of the XOR element 508 is "0." On the other hand, if the value of consecutive samples is "1" then "0" or "0" then "1" (i.e., XOR inputs of "10" or "01") then a transition has occurred between the samples and the output of the XOR element 508 is "1."

The output of the signal transition detection assembly is provided to a counter 510. The counter 510 begins counting the number of actual clocks (e.g., clock cycles) between signal transitions according to the expected timing, T, upon receiving an output from the signal transition assembly indicating that a signal transition has occurred. For example, an output of "1" from the XOR element 508 triggers the counter 510 to reset and begin counting. When a subsequent signal transition occurs, the XOR element 508 triggers the counter 510 again, at which point the counter 510 outputs the clock count, resets and begins counting again. The clock count output by the counter 510 corresponds to the actual clock count between signal transitions, according to the expected timing, T. In this example, the counter 510 begins counting at zero, so a clock count of 18 is output as 17 (counting from 0 to 17).

The output from the counter 510 is provided as an input to a range determination assembly, which determines whether the actual clock count falls within a range corresponding to a 18T transition, within a range corresponding to a 36T transition, or neither. In this example, the range determination assembly include two adders 512, 514 and a multiplexer (MUX) 516. The adder 512 includes an additional input of "17," which is the expected clock count if the signal transition corresponds to an 18T transition. The adder 514 includes an additional input of "35," which is the expected clock count if the signal transition corresponds to an 36T transition. The difference between the respective inputs of "17" and "35" of the adders 512, 514 and the input of the actual clock count from the counter 510 is provided to the MUX 516. If the actual clock count from the counter 510 falls within the predetermined range of [12, 22] (i.e., the difference from the adder is within +/−5 as compared to the expected clock count of "17"), then the signal transition corresponds to an 18T transition with an error corresponding to the difference. Likewise, if the actual clock count from the counter 510 falls within the predetermined range of [25, 45] (i.e., the difference from the adder is within +/−10 as compared to the expected clock count of "35"), then the signal transition corresponds to a 36T transition with an error corresponding to the difference. The output from each adder 512, 514 is provided as an input to the MUX 516, where each input corresponds to the difference between the actual clock count and the expected clock count as determined by the corresponding adder 512, 514.

The MUX 516 determines if the difference between the actual clock count and the expected clock count of 17 is within the range corresponding to the 18T transition (e.g., within +/−5), if the difference between the actual clock count and the expected clock count of 35 is within the range corresponding to the 36T transition (e.g., within +/−10), or neither. For example, if the output from the adder 512 is within +/−5 clock counts (e.g., an actual clock count of 22, which is +5 clock counts), then the actual clock count falls within the range of [12, 22] and corresponds to the 18T transition. In this example, the output from the adder 514 is not within +/−10 clock counts, so the actual clock count does not fall within the range of [25, 45] and does not corresponds to the 36T transition. As such, the MUX 516 selects the difference between the actual clock count and the expected clock count from the adder 512, and does not select the input from the adder 514.

On the other hand, if the output from the adder 514 is between +/−10 clock counts (e.g., an actual clock count of 25, which is −10 clock counts), then the actual clock count falls within the range of [25, 45] and corresponds to the 36T transition. The output from the adder 512 is not within +/−5 clock counts, so the actual clock count does not fall within the range of [12, 22] and does not corresponds to the 18T transition. In this case, the MUX 516 selects the difference between the actual clock count and the expected clock count from the adder 514, instead of the input from the adder 512. In the event the actual clock count does not correspond to either the 18T transition or the 36T transition, (e.g., the input from adder 512 is not within +/−5 and the input from the adder 514 is not within +/−10), the MUX 516 may select an input of "0", which effectively results in no change in the timing given that identification of the signal transition remains unresolved.

Based on the selected difference, the MUX 516 provides an output phase error signal corresponding to the expected clock count. The MUX 516 may be hard-coded or otherwise designed to select the appropriate input. For example, the MUX 516 may be designed as an integrated circuit (e.g., application-specific integrated circuit (ASIC)), that includes a set of comparators for each input that compares the input to the upper and lower parameters of the range. For example, a comparator may compare the input from the adder 512 to −5 (or other desired lower range parameter) and another comparator compares the input to +5 (or other higher range parameter). The comparators may output a "1" if the logical comparison is "true" and output a "0" if the comparison if false. If both are true, then the actual clock count is deemed to correspond to the 18T transition, and the MUX 516 selects the input from the adder 512. On the other hand, another set of comparators may compare the input from the adder 514 to −10 and to +10, and if the comparator outputs are both "true" then the actual clock count is deemed to correspond to the 36T transition, and the MUX 516 selects the input from the adder 514. If the output is "false" for the comparator sets of both inputs from adders 512, 514, then the MUX 516 may select the "0" input. Although the above example relates to a particular implementation and design of the MUX 516, it should be understood by those of ordinary skill in the art that the MUX 516 may be otherwise implemented as desired, either alone or in conjunction with other elements, to perform the above-described selection. For example, the comparators and other logical elements may be implemented external to the MUX 516 to generate an external selection signal, and the MUX 516 may be implemented as a generic MUX that selects an input based on the external selection signal. Regardless of the implementation, in this example the MUX 516 outputs the results of the adder 512 if the count is between [12, 22], outputs the results of the adder 514 if the count is between [25, 45] and outputs 0 for all other conditions.

If the difference is positive (i.e., more actual clock counts than expected clock counts), then the expected timing, T, is too fast, and if the difference is negative, then the expected timing, T, is too slow. A difference of zero indicates that the expected timing, T, is matched with the HFM timing. In any case, the phase error signal is fed into a timing loop to adjust the expected timing, T. An input of zero is provided to the MUX 516 in the event the actual clock count does not fall within either range, thereby forcing a phase difference of zero from the MUX 516 to avoid erroneous adjustment of the expected timing, T.

Figure 8:
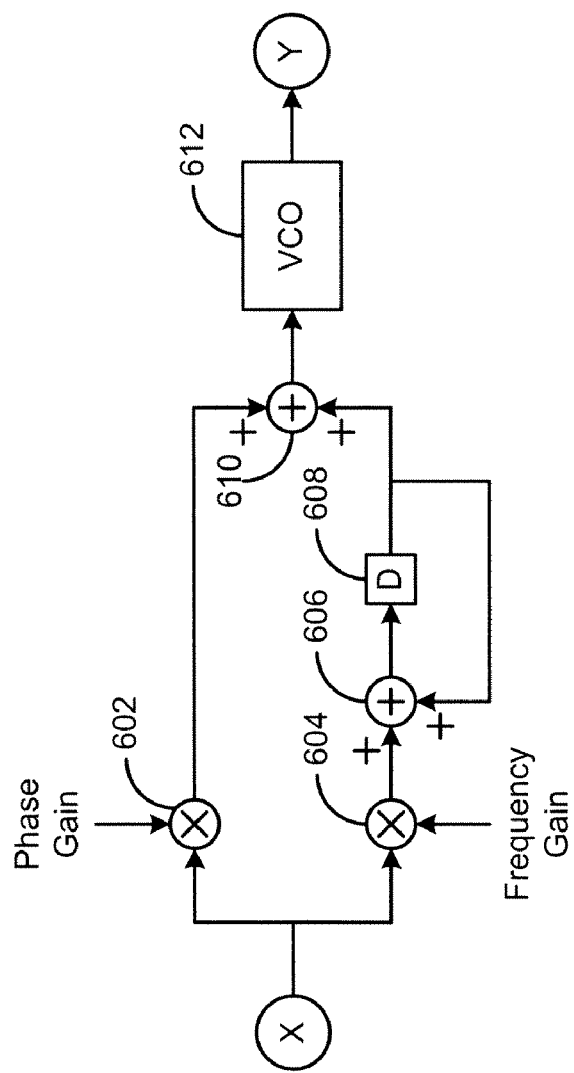
FIG. 8 is a block diagram of an example timing loop used to drive the analog-to-digital converter of the timing recover and decoder circuit of FIG. 7.

FIG. 8 is an example of a timing loop or phase locked loop (PLL), which may be used to adjusting the timing T for the error from the timing recovery and decoding circuit of FIG. 7. The output of the timing loop/PLL may be fed back to the timing recovery and decoding circuit, or any other element of the optical data storage system 10 that utilizes HFM timing to read data from the disc. For example, the timing recovery and decoding circuit may use the adjusted timing T as the sampling rate for the ADC 502, for the delay element 506 and for the counter 510, among others. Timing loops and PLLs are generally well-understood by those of ordinary skill in the art. Accordingly, it should be understood by those of ordinary skill in the art that the timing loop/PLL of FIG. 8 is exemplary only, and other methods and apparatus for adjusting the timing T based on the error signal from the timing recovery and decoding circuit may be utilized.

Referring to FIG. 8, the timing/phase locked loop includes a phase gain multiplier 602, a frequency gain multiplier 604, an integrator/cumulator having an adder 606 and a delay element 608, and a voltage control oscillator (VCO) 612. The phase gain and frequency gain may be programmable, and may be chosen based on the type of frequency disturbance for which the timing is being compensated.

The phase error signal from the timing recovery and decoder circuit is split to a phase branch having the phase multiplier 602 and to a frequency branch having the frequency gain multiplier 604 and the integrator/cumulator. The output of each branch is provided to the adder 610, which outputs a bias voltage to the VCO 612. The effect is to have the output voltage (or frequency) equal to the input voltage (or frequency). Using the bias voltage, the VCO 612 is set to a nominal setting to run or oscillate according to timing T, which now corresponds to the HFM timing and generates clock information according to T. The output of the VCO 612 is then used to drive the ADC 502 or any other element that relies upon the timing T. It is noted, however, that a numeric control oscillator may be used in place of the VCO 612.

The description of the timing recovery and decoder circuit thus far provides an example for recovering the timing of the HFM signal as received by the optical data storage system 10. However, the above described circuit may also be used, in part, to recover the synchronization pattern from the readback signal and decode the HFM signal. Referring again to FIG. 7, the timing recovery and decoder circuit includes a synchronization assembly. The synchronization assembly is used to search for the unique waveform corresponding to the sync pattern. In this example, the synchronization assembly includes a first range element 518, a delay element 520, a second range element 522 and a logical conjunction (AND) element 524.

Generally, the synchronization assembly receives the clock counts from the counter 510, which are input to the first range element 518 and the delay element 520. In this example, the delay factor of the delay element 520 is set to delay the input until a subsequent clock count is received from the counter 510. For example, the clock count in the delay element 520 may be "pushed out" upon receipt of the next clock count from the counter 510. The delayed clock count is then provided as an input to the second range element 522. As a result, two consecutive clock counts may be simultaneously provided to each of the range elements 518, 520.

In one example, the range elements 518, 520 may be each be provided as comparators and an AND element, where a first comparator compares the inputted actual clock count to 51 (or other desired lower range parameter) and a second comparator compares the inputted actual clock count to 55 (or other higher range parameter). The comparators may output a "1" if the logical comparison is "true" and output a "0" if the comparison if false. For example, the first comparator may output a "1" if the actual clock count is greater than or equal to 51, and the second comparator may output a "1" if the actual clock count is less than or equal to 55. In this case, the comparator outputs are provided as inputs to the AND element, which outputs a "1" indicating that the actual clock count for the corresponding range element is between 51 and 55 clock counts. If the first and/or second comparator outputs a "0", then the actual clock count does not fall within the range, and the AND element outputs a "0" to the AND element 524. In the alternative, the AND element 524 may be provided as a four-input AND element that receives the outputs directly from the first and second comparators of each range element 518, 522. Although the above example is one manner of implementing the range elements 518, 522, those of ordinary skill in the art will recognize that various implementations of the range elements 518, 522 may be utilized.

Each of the first and second range elements 518, 522 determines whether the respective actual clock count from the counter 510 falls within the predetermined range of [51, 55] (i.e., the difference is within +/−2 as compared to the expected clock count of "53"). As with the range parameters for the clock count ranges of the timing recovery described above, the range parameters or clock count deviations for the synchronization assembly may be set according to the expected or probable range of errors in the timing, or as otherwise desired. If so, then the output of the range element 518, 522 may be provided as a "1" or other indication that the actual clock count corresponds to a 54T transition. If the difference is greater than +/−2, then the output of the range element 518, 522 may be provided as a "0" or other indication that the actual clock count does not correspond to a 54T signal transition. If consecutive actual clock counts each correspond to a 54T transition as determined by the respective range elements 518, 522, then the outputs of the range elements 518, 522 (e.g., "1" and "1") trigger an indication that the synchronization pattern has been found. In the example shown in FIG. 7, the outputs are provided to the AND element 524, which outputs a "1" as the indication that the synchronization pattern has been found. As such, the timing recovery and decoder circuit is able to recover the synchronization pattern by identifying the successive 54T clock counts unique to the synchronization body 202 by having both range elements 518, 522 perform the comparisons concurrently for successive actual clock counts from the counter 510.

In addition to recovering the synchronization pattern, the timing recovery and decoder circuit may further be used to decode the readback signal as read from the disc. As shown in FIG. 7, the output from the AND element 524 may be provided to another counter 526. When a "1," or other indication that the synchronization pattern has been found, is provided to the counter 526, the counter 526 is reset and begins counting from 0 to 17, which corresponds to the channel bits of 18T, which is the HFM bit clock (i.e., a channel bit every 18T). The counter may count according to the expected clock count, T. Once a count of 17 has been reached, the HFM bit clock is set at an HFM bit clock element 528 and provided to a decoding assembly, which may include an integrate and dump filter 530, a delay element 532, a comparator 534 and a signal transition detection assembly. The HFM clock element 528 may be provided as a comparator that determines if the clock count equals "17" and provides a corresponding output to the integrate and dump filter 530. As will be understood by those of ordinary skill in the art, the channel bit size of 18T corresponds with the Blu-ray standard, but is exemplary only, and the count may correspond to whatever the channel bit size may be. It should also be understood that while an integrate and dump filter 530 is disclosed, other filter assemblies may be used that are set to filter the incoming signal in increments corresponding to the channel bit size.

The integrate and dump signal receives the output from the slicer 504, which is delayed by the delay element 532. The delay element 532 delays the slicer output to match the HFM clock (e.g., a period of 17 channel bits, counting from 0 to 17) to the channel samples. As discussed above, the readback signal is represented by a "0" or "1" for each sample taken according to the expected timing, T, and 18 samples (counted from 0 to 17) generally correspond to a channel bit, as shown in FIGS. 3 and 4. The delay element 532 delays the samples to match the HFM clock as inputted to the integrate and dump filter 530.

Generally, the integrate and dump filter 530 sums the samples and resets the sum to zero every N input samples, where N is the integration period parameter as set by the HFM bit clock. That is, the integrate and dump filter 530 integrates the samples delayed by the delay element 532, and resets to zero every 17 clocks, as set from the HFM bit clock element 528. The reset occurs after the block produces its output at that time step. After 17 clocks, the integrate and dump filter 530 outputs the sum of the inputted samples accumulated during that time. For example, if the output from the slicer 504 for 17 clocks (i.e., 18T) is provided as "000000111111111111" which corresponds to a readback signal having a low level for 6 clocks and a high level for 12 clocks, the integrate and dump filter 530 outputs a value of "12". In another example, if the slicer output is provided as "00000000000001111" for 17 clocks, which corresponds to a readback signal having low level for 14 clocks and a high level for 4 clocks, the integrate and dump filter 530 outputs a value of "4".

Based on the output from the integrate and dump filter 530, the comparator 534, or other comparable element, determines whether the sum from the integrate and dump filter 530 is greater than or equal to "8". This value is chosen as the midpoint in the 17 clock count, where any value less than "8" corresponds to a channel bit of "0" and any value equal to or less that "8" corresponds to a channel bit of "1". Ideally, the expected timing, T, corresponds to the actual timing of the HFM signal, and the timing recovery and decoder circuit synchronizes with the signal. However, this is not always the case, as the synchronization and/or timing may be off due to errors in the expected timing, T, for example. Although the expected timing, T, may be adjusted for errors based on the timing recovery technique described above and various aspects of the timing recovery and decoder circuit may use this adjusted timing, the decoding of the signal may still account for the errors in synchronization and/or timing.

In order to address the potential for errors, the timing recovery and decoder circuit simply determines whether the readback signal received at the integrate and dump filter 530 mostly corresponds to a "1" (e.g., mostly a high level for 17 clocks) or mostly corresponds to a "0" (e.g., mostly a low level for 17 clocks). The comparator 534 makes this determination by comparing the filter output to the "8". For example, if the slicer output is provided as "000000111111111111" (i.e., a sum of "12" from the filter 530), then that 17 clock portion of the readback signal mostly corresponds to high level, and a "1" is output from the comparator 534. On the other hand, if the slicer output is provided as "00000000000001111" for 17 clocks, that portion of the readback signal mostly corresponds to a low level, and a "0" is output from the comparator 534. Using this technique, or similar techniques, the timing recovery and decoder circuit is able to identify the waveform (i.e., the highs and lows) of the readback signal.

The output of the comparator 534 is provided to another signal transition detection assembly, which monitors and detects signal transitions in the readback signal. In this example, similar to the signal transition detection assembly above, the signal transition detection assembly includes a delay element 536 and an exclusive disjunction element, such as an exclusive-or circuit (XOR) element 538. The output from the comparator 534 is split with one branch provided as an input into the delay element 536 and the other branch provided as an input to the XOR element 538. The output of the delay element 536 is provided as another input to the XOR element 538. In this example, the delay factor of the delay element 536 is set to the HFM bit clock corresponding to the size of the channel bits (e.g., 17 clock counts). The delay element 536 delays the one input to the XOR element 538, such that the values for consecutive 18T increments from the comparator 534 may be compared. As a result, the delay element 536 and XOR element 538 are able to detect transitions from high to low or low to high in the readback signal, where the signal transitions, and hence the XOR output, correspond to the channel bit values. For example, if consecutive increments each have a value of "1" or "0" (i.e., XOR inputs of "11" or "00"), then no transition has occurred between the samples and the output of the XOR element 538 (and corresponding channel bit value) is "0". On the other hand, if the value of consecutive increments is "1" then "0" or "0" then "1" (i.e., XOR inputs of "10" or "01") then a transition has occurred between the samples and the output of the XOR element 538 (and corresponding channel bit value) is "1."

From the channel bit output of the XOR element 538, the bi-phase modulation may be recovered. Because a bi-phase modulated bit is provided as a channel bit pair, and each bi-phase modulated bit begins with a signal transition, the channel bits for each bi-phase modulated bit are provided in the form of "1X". As such, consecutive channel bits "10" are detected as a bi-phase modulated bit of "0" and consecutive channel bits "11" are detected as a bi-phase modulated bit of "1".

Figure 9:
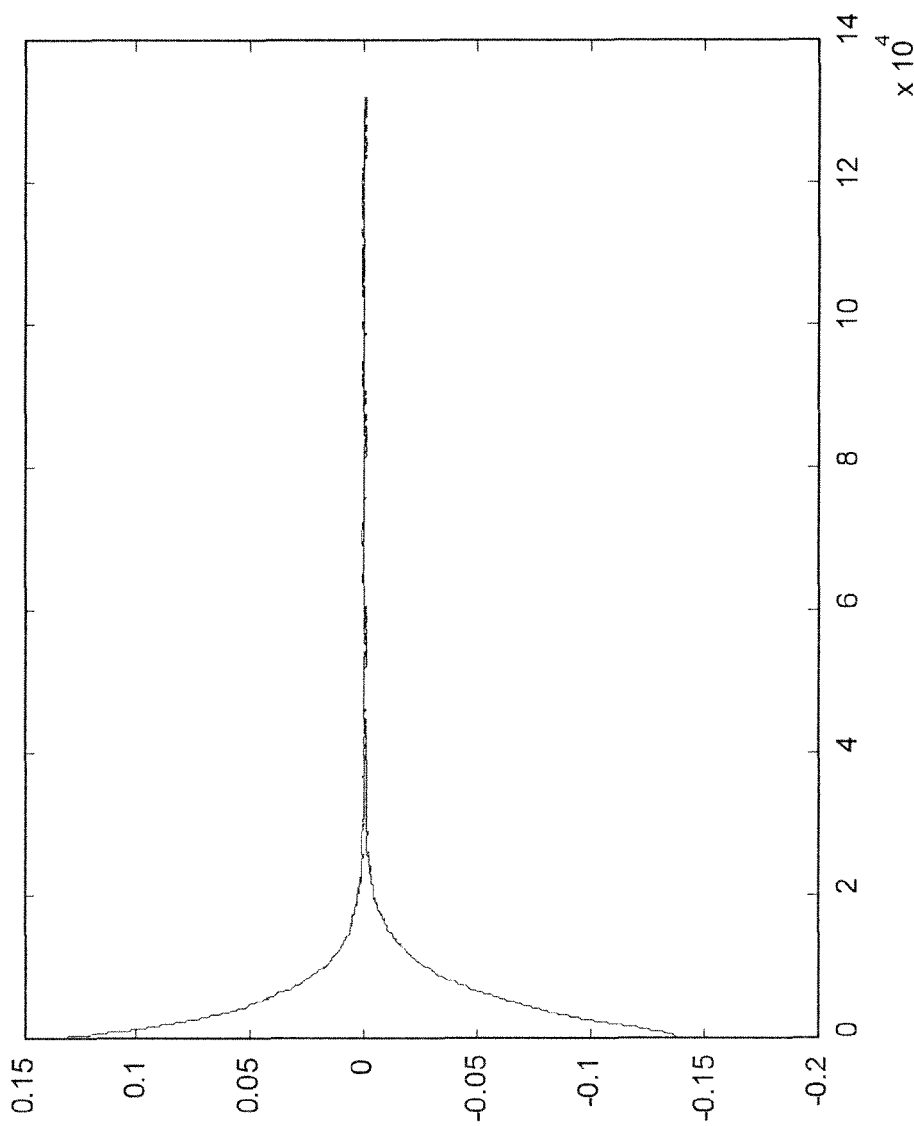
FIG. 9 is a graph illustrating an example of a timing recovery performance of the timing loop of FIG. 8 using the timing recovery and decoder circuit of FIG. 7.

FIG. 9 is a graph illustrating an example of a timing recovery performance of the timing loop of FIG. 8 using the timing recovery and decoder circuit of FIG. 7. As seen in FIG. 9, the timing loop has a large capture range (i.e., captured waveform with intentional frequency offset). For example, knowing the rotation (spindle) speed and diameter of the disc, the firmware of the optical drive system 10 can calculate the expected timing of the HFM signal. However, this calculation is only an approximation that does not account for jitter due to varying rotation speed, off-center rotation or other effects that vary the timing. The spacing of the HFM signal as encoded on the disc is the true frequency or timing that should be recovered in order to properly decode the signal, and the HFM detection and timing recovery technique uses the readback signal to recover the actual timing of the HFM signal and adjust the expected timing accordingly.

Referring to FIG. 9 where the Y-axis of the graph indicates the phase error in the HFM timing, T, expressed as a percentage error, and the X-axis indicates time, it can be seen that the HFM detection and timing recovery technique may recover the HFM timing up to +/−14%. That is, even if the calculated expected timing is off by up to 14%, the HFM detection and timing recovery technique may still compensate for this error without firmware interruption, and the HFM detection may continually update the expected timing using the 18T and 36T signal transitions within the bi-phase modulated HFM signal.

Accordingly, the above described timing recovery and decoder circuit provides one example in which the HFM timing may be recovered from a readback signal using, for example, a timing recovery assembly including the delay element 506, the XOR element 508, the counter 510, the adders 512, 514 and the MUX 516. The exemplary timing recovery and decoder circuit further recovers the synchronization pattern in the HFM signal using the output from the counter 510 and a synchronization assembly including first and second range elements 518, 522, a delay element 520 and an AND element 524. Still further, the exemplary timing recovery and decoder circuit is able to decode the HEM signal using a decoder assembly that may be triggered by the synchronization assembly and includes a counter 526, comparator 528, integrate and dump filter 530, delay element 532, comparator 534, delay element 536 and XOR element 538.

Figure 10:
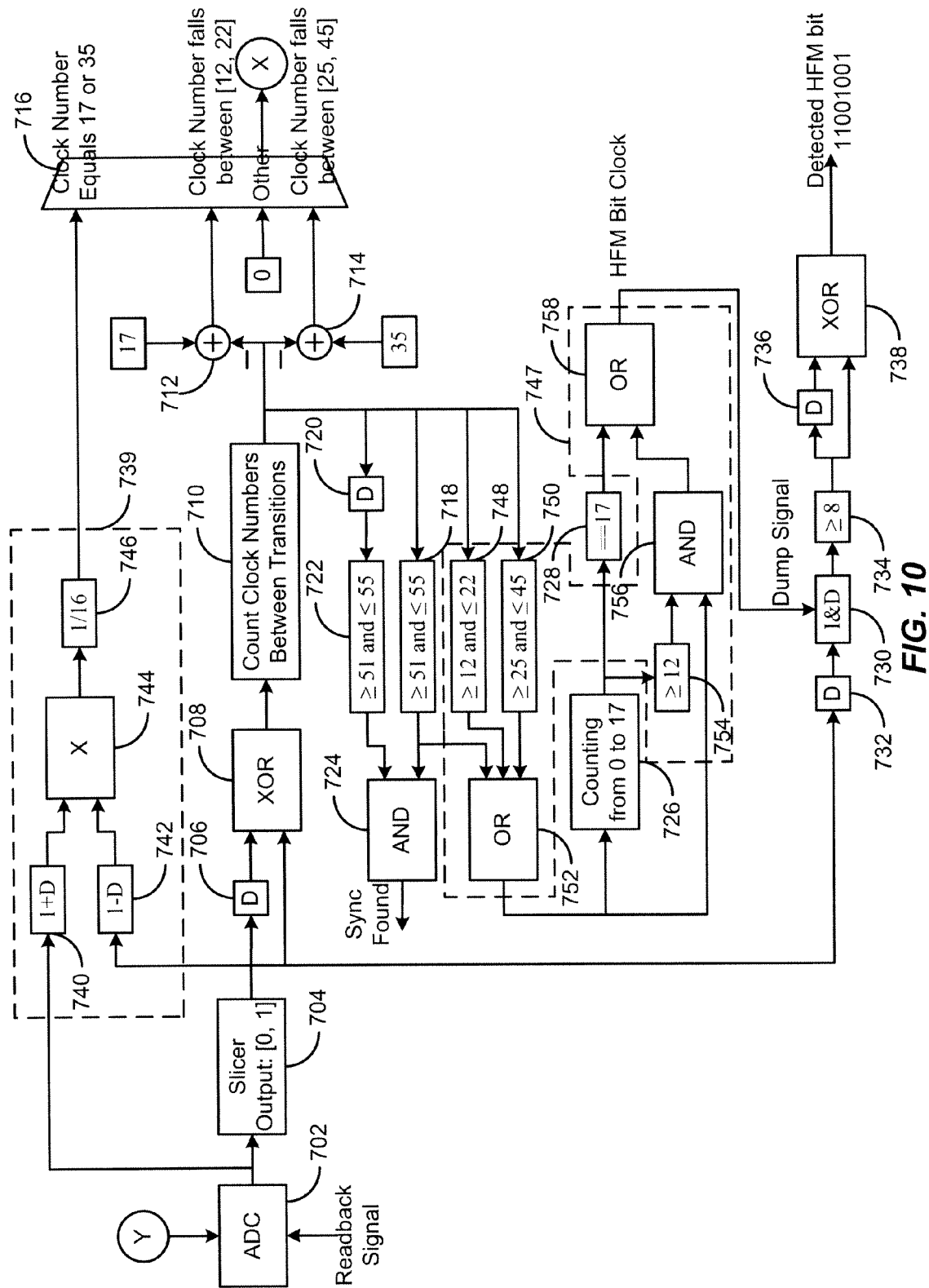
FIG. 10 is a block diagram of an alternative example timing recovery and decoder circuit that implements timing recovering of the high frequency modulation signal to identify a timing error in recovering the HFM signal of a Blu-ray Disc.

FIG. 10 is a block diagram of another example of a timing recovery and decoder circuit in which the HFM timing may be recovered from a readback signal. In particular, the block diagram of FIG. 10 includes many of the same elements as disclosed and described with respect to FIG. 7, with similar elements having numerical references of 702-738 corresponding with references 502-538 in FIG. 7, respectively. Accordingly, further description of these element need not be provided. For example, the circuit of FIG. 10 includes a timing recovery assembly including a delay element 706, an XOR element 708, a counter 710, adders 712, 714 and a MUX 716. This example of the timing recovery and decoder circuit further recovers the synchronization pattern in the HFM signal using an output from a counter 710 and a synchronization assembly including first and second range elements 718, 722, a delay element 720 and an AND element 724. Still further, the exemplary timing recovery and decoder circuit is able to decode the HFM signal using a decoder assembly that may be triggered by the synchronization assembly and includes a counter 726, comparator 728, integrate and dump filter 730, delay element 732, comparator 734, delay element 736 and XOR element 738.

In addition, the timing recovery and decoder circuit of FIG. 10 further includes a multiplier assembly 739 and a counter reset assembly 747. The multiplier assembly 739 is provided as an alternative technique for resolving a phase error. The timing loop of FIG. 8 then uses the phase error to generate clock information corresponding to the clock timing from the bi-phase modulated portion of the HFM signal. In particular, the timing recovery assembly of FIG. 7 resolves the phase error to within one HFM bit. That is, the recovery assembly of FIG. 7 attempts to correct the timing only if the expected clock count has drifted more than +/− one HFM bit (i.e., in multiples of T). In the event this resolution is still to coarse such that better resolution is desired, the multiplication assembly of FIG. 10 may resolve the phase error more quickly and more efficiently. For example, if the frequency offset is small (i.e., less than T), the phase error will be spaced far apart, and the cumulative phase error may be greater than T. Accordingly, more frequent, finer phase error resolution may be desired.

The multiplication assembly of FIG. 10 utilizes the zero crossing (transitions) of the output from the ADC 702, that is, when the measured distances between signal transitions is exactly 18T (17 clock counts) or 36T (35 clock counts), to generate the phase error. In particular, the multiplication assembly multiplies the sampled output of the readback signal from the ADC 702 with the sign of the signal transition from the output of the slicer 704. The sign of the signal transition is an indication of whether the sinusoidal output from the ADC 702 is a rising edge or a falling edge. Similar to the slicer 504 disclosed above with respect to FIG. 7, the slicer 704 removes portions of the waveform near the positive and negative peaks thereby converting the sinusoidal output from the ADC into outputs of "0" or a "1" for each sample, where the "0" may correspond to a low level in the waveform of the readback signal, and the "1" may correspond to a high level. It is noted, however, that the slicer of both FIG. 7 and FIG. 10 can output a "−1" instead of a "0", if desired.

The output of the ADC 702 is provided to a 1+D delay element 740 and the output of the slicer 704 is provided to a 1−D delay element 742, where 1−D of the slicer output is the sign of the signal transition (i.e., rising or falling) if there is any signal transition occurring. The "D" refers to the delay, which may be set at one sample delay. As such, 1+D refers to the current sample delay plus the previous sample delay, and 1−D refers to the current sample delay minus the previous sample delay. For example, if the output from the slicer 704 is " . . . , 0, 0, 0, 1, 1, 0, 0, . . . ", then the output from the 1−D delay element would be " . . . 0, 0, 1, 0, −1, 0, . . . " where the previous sample is subtracted from the current sample (e.g., 0−0=0, 0−0=0, 1−0=1, 1−1=0, 0−1=−1, 0−0=0).

In this example, the delay factor, D, of the delay elements 740, 742 is set to T. If a signal transition is on a rising edge, then the output of the 1−D delay element 742 is a positive one (+1), and if a signal transition is on a falling edge, then the output of the 1−D delay element 742 is negative one (−1). The outputs of the delay elements are provided to a multiplier 744, which ensures that the phase error maintains the correct sign. The output of the multiplier 744 may be multiplied by a coefficient 746 (e.g. 1/16), which may be programmable to adjust the gain of the overall timing loop.

The output of the multiplier assembly 739 may then be used as the timing error when the range determination assembly generates a zero. For example, as disclosed above with respect to FIG. 7, the range determination assembly determines whether the actual clock count falls within a range corresponding to a 18T transition, within a range corresponding to a 36T transition, or neither. In the event the actual clock count corresponds with the expected clock count (i.e., the output from adder 712 or adder 714 is zero), the MUX 716 selects the input from the multiplication assembly. As such, if the drift in the expected clock is smaller than one HFM bit, then the system is still able to generate a phase error for the timing loop of FIG. 8.

Figure 11:
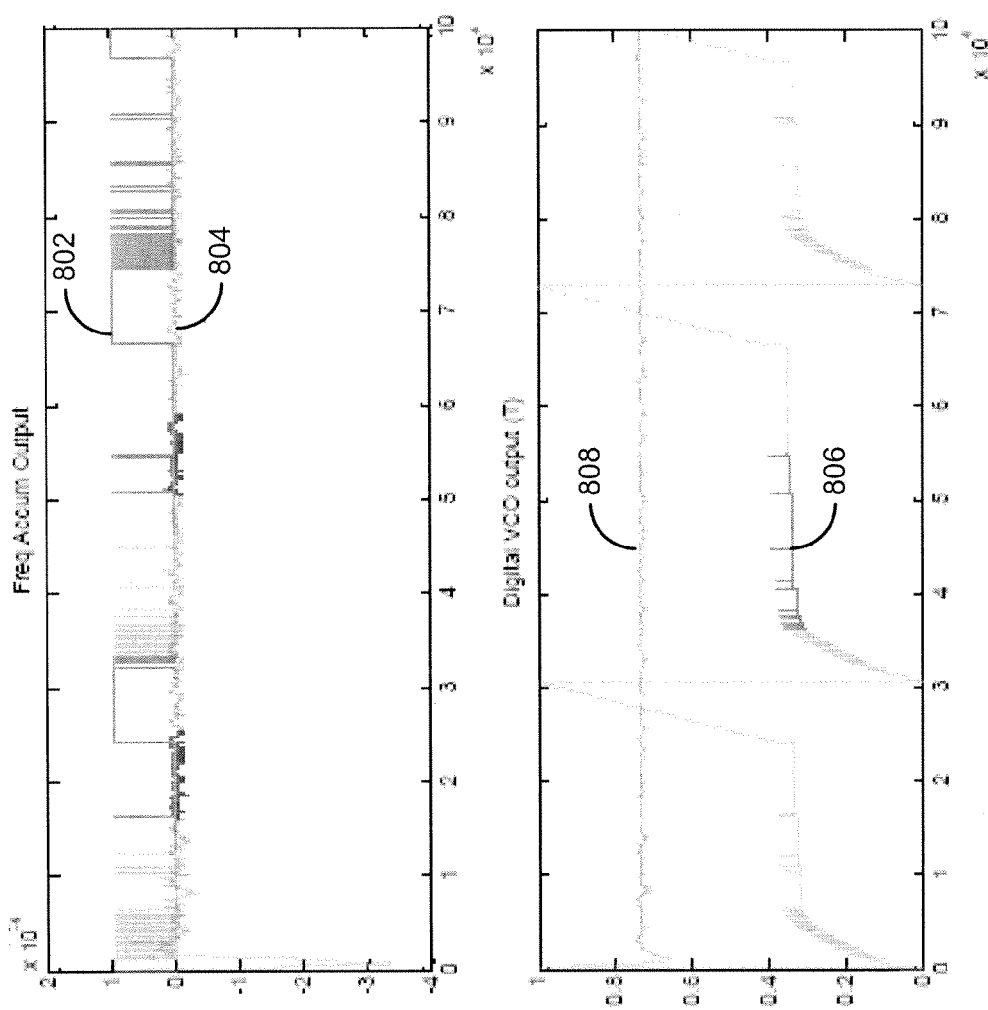
FIGS. 11 and 12 are graphs illustrating an example of a timing recovery performance of the timing loop of FIG. 8 using the timing recovery and decoder circuit of FIG. 10.
Figure 12:
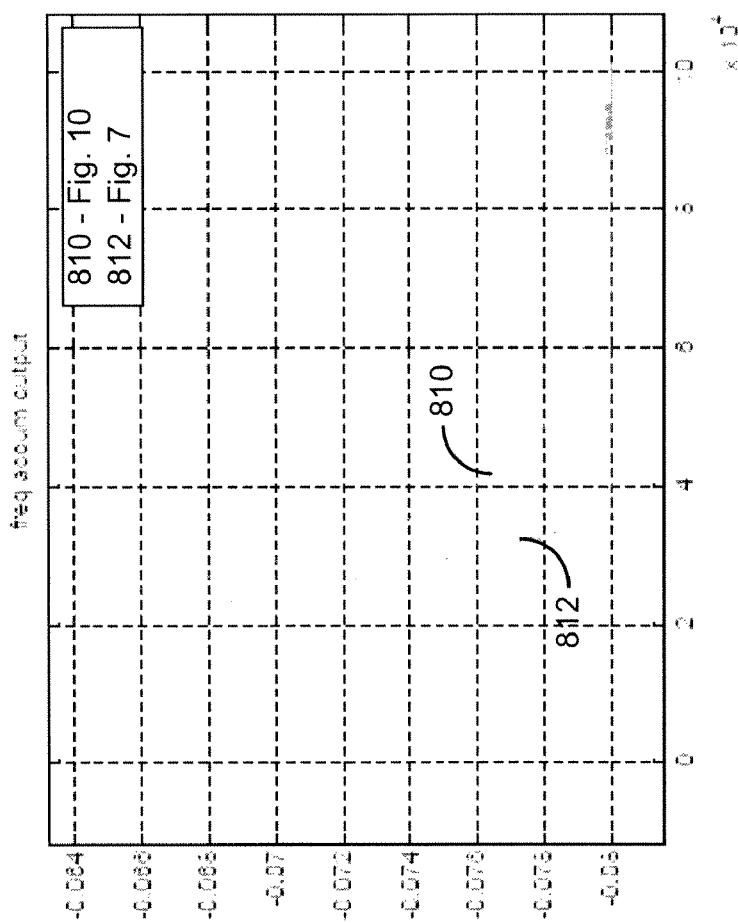

FIGS. 11 and 12 are graphs illustrating an example simulation of the difference of a timing recovery in performance of the timing loop of FIG. 8 using the timing recovery and decoder circuits of FIGS. 7 and 10. As seen in FIG. 11, the timing loop has improved stability when using the timing recovery and decoder circuit of FIG. 10. For example, the upper graph of FIG. 11 depicts a situation where there is no frequency offset, where the Y-axis of the graph indicates the phase error (frequency accumulator output) in the HFM timing, T, expressed as a percentage error, and the X-axis indicates time. Using the timing recovery and decoder circuit of FIG. 7, the frequency accumulator output (which is the actual frequency of the channel clock) as indicated by reference numeral 802 demonstrates that the frequency fluctuates up and down with more amplitude, as compared to the more stable frequency accumulator output as indicated by reference numeral 804 when utilizing the timing recovery and decoder circuit of FIG. 10. In addition, the amplitude of the frequency accumulator output 802 is sometimes maintained for extended periods of time, which allows for more opportunity for drift. This is not seen in the simulation using the timing recovery and decoder circuit of FIG. 10.

The lower graph of FIG. 11 also depicts a situation where there is no frequency offset, but this time the Y-axis of the graph indicates the output of the timing loop of FIG. 8, and the X-axis indicates time and is aligned in the time domain with the upper graph. The output of the timing loop using the timing recovery and decoder circuit of FIG. 7 (referenced with numeral 806) can experience greater instability during those periods where the frequency accumulator output 802 experiences more amplitude for an extended period. Using the timing recovery and decoder circuit of FIG. 10, the timing loop output as indicated by reference numeral 808 is more stable.

As seen in the graph of FIG. 12, where the Y-axis of the graph indicates the phase error in the HFM timing, T, expressed as a percentage error, and the X-axis indicates time, it can be seen that the HFM detection and timing recovery technique may recover the HFM timing having a timing offset of 8% more quickly using the timing recovery and decoding circuit of FIG. 10 (as represented by graph line 812) as compared to using the timing recover and decoding circuit of FIG. 7 (as represented by graph line 810). That is, the HFM detection and timing recovery technique corresponding to FIG. 10 may allow the timing loop to track and converge faster.

As previously indicated, the timing recovery and decoder circuit of FIG. 10 may also be used, in part, to decode the HFM signal using a counter reset assembly 747. As disclosed with respect to FIG. 7, an integrate and dump filter utilizes an HFM bit clock generated by comparing a counter 526 output to a constant as set at an HFM bit clock element 528, where the HFM bit clock is a dump signal generated every 17 clocks. As also disclosed, the counter 526 is reset between detection of the sync patterns. Between sync pattern detections, the counter 526 is otherwise free running, such that if there is little way to correct the counter 526 if it is wrong. For example, a small frequency offset from the clock may produce errors in decoding the signal. As a result, it is possible for the dump signal to gradually misalign with the data boundary, and if the data boundary is incorrect, the HFM data bit may be incorrect.

In order to correct for this potential dump signal drift, rather than utilizing the detection of the sync pattern, the timing recover and decoder circuit of FIG. 10 utilizes the counter reset assembly 747 to reset the counter 726 at every detected signal transition from the slicer 704. In this example, the counter reset assembly 747 includes a third range element 748, a fourth range element 750, and an inclusive disjunction element, such as an inclusive-or circuit (OR) element 752. The counter reset assembly 747 further includes a comparator 754, a logical conjunction (AND) element 756 and a second inclusive-or circuit (OR) element 758.

Generally, the counter reset assembly 747 receives the clock counts from the counter 710, which are input to the first range element 718, the third range element 748 and the fourth range element 750. In one example, the range elements 748, 750 may be each be provided as comparators and an AND element, where, in the case of the third range element 748, a first comparator compares the inputted actual clock count to 12 (or other desired lower range parameter) and a second comparator compares the inputted actual clock count to 22 (or other higher range parameter). Likewise, the range element 750 may have a first comparator that compares the inputted actual clock count to 25 (or other desired lower range parameter) and a second comparator compares the inputted actual clock count to 45 (or other higher range parameter). The comparators may output a "1" if the logical comparison is "true" and output a "0" if the comparison if false. As understood by those of ordinary skill in the art, the range elements 748, 750 may be implemented similar to those disclosed with respect to range elements 718, 720.

The first, third and fourth range elements 718, 748, 750 determine whether the respective actual clock count from the counter 710 falls within one of the predetermined ranges of [51, 55], [12, 22] or [25, 45], respectively. If so, then the output of the respective range element 718, 748, 750 may be provided as a "1" or other indication that the actual clock count corresponds to a 54T, 18T or 36T transition, respectively. If the difference is greater than the parameters of the respective range elements, then the output of the range element 718, 748 or 750 may be provided as a "0" or other indication that the actual clock count does not correspond to a 54T, 18T or 36T signal transition, respectively. If consecutive actual clock counts each correspond to a 54T, 18T or 36T transition as determined by one of the respective range elements 718, 748, 750, then the outputs of the corresponding range element (e.g., "1") triggers an indication that the a signal transition has occurred, including one that may have occurred in the sync pattern. In the example shown in FIG. 10, the outputs are provided to the OR element 752, which outputs a "1" as the indication that a 54T, 18T or 36T signal transition has occurred.

The output from the OR element 752 may be provided to the counter 726 as well as the AND element 756. When a "1," or other indication that a signal transition has been found, is provided to the counter 726, the counter 726 is reset and begins counting from 0 to 17, which corresponds to the channel bits of 18T, and count according to the expected clock count, T. The output of the counter 726 is provided to both an HFM bit clock element 728 and a comparator 754. Based on the output from the counter 726, the comparator 754, or other comparable element, determines whether the count from the counter 726 is greater than or equal to some threshold, for example, 12. This avoids pulses being generated too close to each other in the HFM bit clock. If the count from the counter 726 is greater than or equal this threshold, the comparator outputs a "1" to the AND element 756. As a result, when the counter 726 is being reset, an HFM bit clock pulse is generated only when the counter output is large enough.

Once a count of 17 has been reached or if a signal transition is detected within at least 12 clocks counts of the last counter reset, then the HFM bit clock is set at the OR element 758 and provided as a dump signal to the integrate and dump filter 730 of the decoding assembly. By resetting the counter 726 at every detected signal transition, the resulting HFM bit clock aligns with the true data boundary, and the dump signal is generated at the correct location in the signal being decoded. As such, the correct HFM bit may be ensured even with a small frequency offset, such that there is an improved tolerance for timing errors.

As previously indicated, the above-described timing recovery and decoder circuits are provided as examples only, and those of ordinary skill in the art may replace, add, remove or modify elements within the circuits as desired without departing from the teachings of the techniques and functionality that have been described herein. It will also be recognized that the various aspects of the timing recovery and decoder circuits may be provided separately or in different combinations (e.g., decoder assembly separate from the timing recovery assembly and synchronization assembly, timing recovery assembly separate from the synchronization assembly and decoder assembly, etc.).

As least some of the various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the HFM detection and timing recovery technique has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of recovering clock timing from a bi-phase modulated portion of a high frequency modulation (HFM) signal, wherein the HFM signal comprises signal transitions between a high level and a low level, the method comprising:
   initiating a clock count upon detection of a first signal transition in the bi-phase modulated portion of the HFM signal, wherein the clock count corresponds to an expected clock timing of the HFM signal;
   stopping the clock count upon detection of a second signal transition in the bi-phase modulated portion of the HFM signal subsequent to the first signal transition, wherein an actual clock count comprises a number of clock cycles occurring between the first and second signal transitions based on the expected clock timing;
   identifying a first expected clock count between signal transitions of the bi-phase modulated portion of the HFM signal if the actual clock count between the first and second signal transitions falls within a first range of clock counts and determining a first error between the actual clock count and the first expected clock count; and
   identifying a second expected clock count between signal transitions of the bi-phase modulated portion of the HFM signal if the actual clock count between the first and second signal transitions falls within a second range of clock counts and determining a second error between the actual clock count and the second expected clock count.

2. The method of claim 1, wherein the first error between the actual clock count and the first expected clock count or the second error between the actual clock count and the second expected clock count comprises a clock timing error in the expected clock timing.

3. The method of claim 2, further comprising:
   applying the clock timing error as a phase error to a timing loop, wherein the timing loop uses the phase error signal to generate clock information corresponding to the clock timing from the hi-phase modulated portion of the HFM signal; and
   driving an analog-to-digital converter to sample the readback signal of the bi-phase modulated portion of the HFM signal according to the clock information generated by the timing loop.

4. The method of claim 1, wherein:
   the first range of clock counts comprises the first expected clock count and a first subset of clock count deviations from the first expected clock count, and
   the second range of clocks counts is non-overlapping with the first range of clock counts and comprises the second expected clock count and a second subset of clock count deviations from the second expected clock count.

5. The method of claim 1, further comprising:
   multiplying a sampled readback signal read from an optical disc with a sign of a transition in the sampled readback signal to produce a product, wherein the readback signal comprises a waveform that transitions between high levels and low levels corresponding to bumps and lands of the optical disc and the sign comprises digitized data corresponding to high and low levels in the sampled readback signal; and
   utilizing the product of the sampled readback signal and the sign as an error in the clock count if the actual clock count between the signal transitions comprises either the first expected clock count or the second expected clock count.

6. The method of claim 5, further comprising multiplying the product of the sampled readback signal and the sign by a coefficient to adjust a gain of a timing loop used to drive an analog-to-digital converter to sample the readback signal of the bi-phase modulated portion of the HFM signal.

7. The method of claim 1, further comprising determining a third error to be zero if the actual clock count between the signal transitions falls within neither of the first and second ranges of clock counts.

8. The method of claim 1, further comprising resetting and restarting the clock count upon detection of the second signal transition in the bi-phase modulated portion of the HFM signal.

9. The method of claim 1, further comprising:
   identifying a third expected clock count between signal transitions of the bi-phase modulated portion of the HFM signal if the actual clock count between the first and second signal transitions falls within a third range of clock counts, wherein the third range of clock counts is non-overlapping with the first and second ranges of clock counts and comprises a third expected number of clock counts between the signal transitions corresponding to a synchronization pattern in the HFM signal based on the expected clock timing and a third subset of clock count deviations from the third expected clock count;
   generating an HFM clock upon identifying one of: the first expected clock count, the second expected clock count or the third expected clock count;
   matching a readback signal to the HFM clock;
   detecting occurrence of signal transitions in a waveform of the readback signal; and
   recovering channel bits of the HFM signal from the detected signal transitions in the waveform of the readback signal; and
   recovering bi-phase modulated HFM bits from the recovered channel bits.

10. A timing recovery and decoding apparatus for a high frequency modulation (HFM) signal, the apparatus comprising:
    a signal transition assembly configured to detect signal transitions in a readback signal read from an optical disc and output a trigger signal when a signal transition is detected, wherein the readback signal comprises a waveform that transitions between high levels and low levels;
    a counter configured to count a number of clock signals between transitions between the high and low levels of the readback signal, wherein the counter is triggered to reset and begin each count in response to the trigger signal;
    a multiplier assembly configured to multiply a sampled readback signal with a sign of a signal transition in the sampled readback signal, wherein the sign comprises digitized data corresponding to high levels and low levels in the sampled readback signal; and a range determination assembly coupled to a clock count output from the counter and coupled to a product output from the multiplier assembly, and configured to determine if the clock count falls within a range of clock counts corresponding to an expected clock count between signal transitions in a bi-phase modulation portion of the HFM signal, and to determine a first error between the clock count and the expected clock count, or utilize the product output as a second error in the clock count if the clock count output is equivalent to the expected clock count.

11. The timing recovery and decoding apparatus of claim 10, wherein the second error comprises a clock timing error in the expected clock timing.

12. The timing recovery and decoding apparatus of claim 10, further comprising:

an analog-to-digital converter configured to sample the readback signal at a sampling rate corresponding to the expected clock timing; and a slicer configured to output digitized data corresponding to high and low levels in the sampled readback signal, wherein the signal transition assembly is configured to detect transitions between the high levels and low levels of the sampled readback signal, and wherein the multiplier assembly is configured to multiply the digitized data output from the slicer with the sampled readback signal and output the product output.

13. The timing recovery and decoding apparatus of claim 12, wherein the multiplier assembly comprises:

a first delay element configured to delay the digitized samples of the readback signal from the slicer by at least one minus one sample of the readback signal;

a second delay element configured to delay the sampled readback signal by at least one plus one sample of the readback signal; and a multiplier configured to multiply the digitized data output from the first delay element with the sampled readback signal from the second delay element.

14. The timing recovery and decoding apparatus of claim 13, further comprising a coefficient element configured to apply a tuning loop gain coefficient to the product output from the multiplier.

15. The timing recovery and decoding apparatus of claim 10, wherein the range determination assembly is configured to determine if the clock count falls within a first range of clock counts corresponding to a first expected clock count, a second range of clock counts corresponding to a second expected clock count or determine if the clock count comprises the first or second expected clock counts.

16. The timing recovery and decoding apparatus of claim 15, wherein the range determination assembly comprises:

a first adder configured to determine a first difference between the clock count and the first expected clock count;

a second adder configured to determine a second difference between the clock count and the second expected clock count; and a multiplexer configured to receive the first and second differences from the respective first and second adders as inputs, to receive the product output from the multiplier assembly as an input, to select the first difference if the first difference corresponds to a first value in the first subset of clock count deviations, to select the second difference if the second difference corresponds to a second value in the second subset of clock count deviations, to select the product output if the clock count comprises the first or second expected clock counts, and to output the selection as the error between the actual clock count and the first expected clock count.

17. The timing recovery and decoding apparatus of claim 10, wherein the HFM signal comprises a synchronization pattern having consecutive clock counts between signal transitions that are unique within a data frame of the HFM signal, and each bit within the bi-phase modulated portion of the HFM signal corresponds to a pair of channel bits, the apparatus further comprising:

a first range element coupled to the clock count output from the counter and configured to determine if the clock count from the counter falls within a first range of clock counts corresponding to one of the consecutive clock counts in the synchronization pattern;

a second range element coupled to the clock count output from the counter and configured to determine if the clock count from the counter falls within a second range of clock counts corresponding to a first expected clock count;

a third range element coupled to the clock count output from the counter and configured to determine if the clock count from the counter falls within a third range of clock counts corresponding to a second expected clock count;

a first inclusive disjunction element coupled to an output of the first, second and third range elements;

a counter coupled to an output of the first inclusive disjunction element and configured to initiate a clock count in response to the HFM signal indicating identification of the synchronization pattern;

a comparator coupled to a clock output of the counter and configured to determine whether the clock count is greater than or equal to a threshold value clock count, wherein the threshold value block count is less than a number of clock counts in the channel bit;

a logical conjunction element coupled to the output of the first inclusive disjunction element and to a threshold count indication output of the comparator;

an HFM bit clock coupled to the clock output of the counter and configured to set an HFM bit clock having a clock cycle corresponding to the number of clock counts in a channel bit when the clock count from the counter reaches the number of clock counts in the channel bit;

a second inclusive disjunction element coupled to an HFM bit clock output of the HFM bit clock and to an output of the logical conjunction element; and a decoding assembly coupled to an output of the second inclusive disjunction element and configured to decode the readback signal read from the optical disc to recover the channel bits of the bi-phase modulated HFM bits.

18. The timing recovery and decoding apparatus of claim 17, wherein the readback signal is sampled at a sampling rate corresponding to the expected clock timing, and wherein the decoding assembly comprises:

a delay element configured to delay the sampled readback signal to match the sampled readback signal to the HFM bit clock;

a filter coupled to a sampled readback signal output of the delay element and to an output of the second inclusive disjunction element, and configured to sum a number of samples corresponding to a high level of the readback signal and reset the sum according to an integration period as set by the second inclusive disjunction element; and a comparator coupled to a sum output from the filter and configured to determine whether the sampled readback signal during the integration period corresponds to the high level or the low level; and a signal transition detection assembly coupled to a signal level indication output of the comparator, and configured to detect transitions between the high levels and the low levels of the sampled readback signal based on the signal level indication output and to recover the channel bits of the bi-phase modulated HFM bits.

19. The timing recovery and decoding apparatus of claim 18, wherein the signal transition detection assembly comprises:

a delay element coupled to the signal level indication output of the comparator and configured to delay the signal level output from the comparator until a subsequent signal level indication is input from the comparator;

an exclusive disjunction element coupled to a delayed signal level indication output from the delay element and coupled to the signal level indication output of the comparator, wherein the exclusive disjunction element is configured to concurrently compare the delayed signal level indication output from the delay element with a consecutive signal level indication output from the comparator and output a channel bit value based on the occurrence or non-occurrence of differences in value between the delayed signal level indication output and the consecutive signal level indication output.

20. The timing recovery and decoding apparatus of claim 18, wherein the filter comprises an integrate and dump filter.

\* \* \* \* \*